US012250970B2

(12) United States Patent
White et al.

(10) Patent No.: US 12,250,970 B2
(45) Date of Patent: Mar. 18, 2025

(54) APPARATUS FOR AN AEROSOL GENERATING DEVICE

(71) Applicant: Nicoventures Trading Limited, London (GB)

(72) Inventors: Julian White, London (GB); Martin Horrod, London (GB)

(73) Assignee: NICOVENTURES TRADING LIMITED, London (GB)

( * ) Notice: Subject to any disclaimer, the term of this patent is extended or adjusted under 35 U.S.C. 154(b) by 467 days.

(21) Appl. No.: 17/596,286

(22) PCT Filed: Jun. 25, 2020

(86) PCT No.: PCT/GB2020/051543
§ 371 (c)(1),
(2) Date: Dec. 7, 2021

(87) PCT Pub. No.: WO2020/260884
PCT Pub. Date: Dec. 30, 2020

(65) Prior Publication Data
US 2022/0225681 A1    Jul. 21, 2022

(30) Foreign Application Priority Data

Jun. 28, 2019    (GB) .................................... 1909384

(51) Int. Cl.
*H05B 6/06*    (2006.01)
*A24D 1/20*    (2020.01)
(Continued)

(52) U.S. Cl.
CPC .............. *A24F 40/465* (2020.01); *A24D 1/20* (2020.01); *A24F 40/20* (2020.01); *A24F 40/51* (2020.01);
(Continued)

(58) Field of Classification Search
CPC ......... A24D 1/20; A24F 40/20; A24F 40/465; A24F 40/50; A24F 40/51; A24F 40/57;
(Continued)

(56) References Cited

U.S. PATENT DOCUMENTS 4,201,240 A * 5/1980 Case ..................... G01F 23/185
137/392
5,165,049 A   11/1992 Rotman
(Continued)

FOREIGN PATENT DOCUMENTS

| WO | 2018178113 A2 | 10/2018 |
| WO | WO 2018/178114 A2 | 10/2018 |
| WO | WO 2019/122097 A1 | 6/2019 |

OTHER PUBLICATIONS

"PSpC Creator Component Datasheet—Edge Detector 1.0", Cypress Semiconductor Corp., retrieved from https://www.infineon.com, Document No. 001-84890 revision *B, Dec. 2017, pp. 1-6.
(Continued)

*Primary Examiner* — Quang T Van
(74) *Attorney, Agent, or Firm* — BURR & FORMAN LLP

(57) ABSTRACT

A method, apparatus and computer program is described including: applying an impulse to a resonant circuit including an inductive element, for inductively heating a susceptor, and a capacitor, wherein the applied impulse induces an impulse response between the capacitor and the inductive element of the resonant circuit, wherein each impulse response has a resonant frequency; and generating an output signal dependent on one or more properties of the impulse response.

36 Claims, 20 Drawing Sheets

Figure 1:
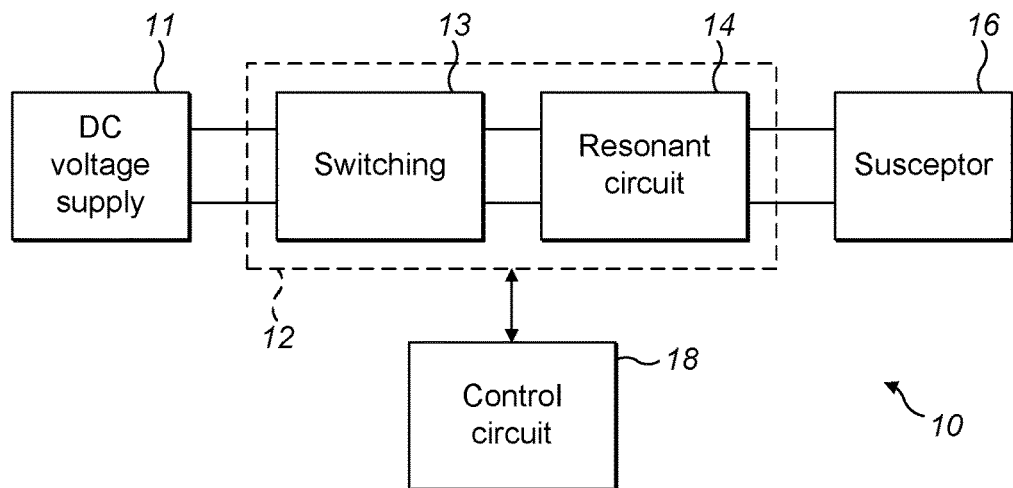

(51) Int. Cl.
　　*A24F 40/20*　　　(2020.01)
　　*A24F 40/465*　　(2020.01)
　　*A24F 40/51*　　　(2020.01)
　　*A24F 40/57*　　　(2020.01)
　　*H02M 7/48*　　　(2007.01)
　　*H02M 7/5387*　　(2007.01)
　　*H05B 6/10*　　　(2006.01)

(52) U.S. Cl.
　　CPC ........... *A24F 40/57* (2020.01); *H02M 7/4815* (2021.05); *H02M 7/5387* (2013.01); *H05B 6/06* (2013.01); *H05B 6/108* (2013.01)

(58) Field of Classification Search
　　CPC ... A24F 40/40; H02M 7/4815; H02M 7/5387; H05B 6/06; H05B 6/108; H05B 6/105; Y02B 70/10
　　USPC ....... 219/618, 635, 660, 661, 662, 663, 666, 219/668, 670, 671; 363/34, 36, 37
　　See application file for complete search history.

(56) References Cited

U.S. PATENT DOCUMENTS

| | | | |
|---|---|---|---|
| 8,350,197 B2* | 1/2013 | Tominaga | H05B 6/062 |
| | | | 219/625 |
| 2010/0147832 A1 | 6/2010 | Barker et al. | |
| 2019/0029078 A1* | 1/2019 | Steele | H05B 6/062 |

OTHER PUBLICATIONS

Office Action (translation) issued in Korean Application No. 10-2021-7039858 on Apr. 18, 2024, all enclosed pages cited.

International Search Report and Written Opinion, International Application No. PCT/GB2020/051543, mailing date Nov. 13, 2020, 17 pages.

Office Action (with English Translation) issued in corresponding Mexican Patent Application No. MX/a/2021/015127 mailed Oct. 16, 2024, all pages cited in its entirety.

\* cited by examiner

APPARATUS FOR AN AEROSOL GENERATING DEVICE

PRIORITY CLAIM

The present application is a National Phase entry of PCT Application No. PCT/GB2020/051543, filed Jun. 23, 2020, which claims priority from Great Britain Application No. 1909384.8, filed Jun. 28, 2019, each of which is hereby fully incorporated herein by reference.

TECHNICAL FIELD

The present specification relates to an apparatus for an aerosol generating device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate.

SUMMARY

In a first aspect, this specification describes an apparatus comprising: an impulse generation circuit for applying an impulse to a resonant circuit comprising an inductive element (for inductively heating a susceptor) and a capacitor, wherein the applied impulse induces an impulse response between the capacitor and the inductive element of the resonant circuit, wherein the impulse response has a resonant frequency; and an output circuit for providing an output signal dependent (at least in part) on one or more properties of the impulse response. The susceptor may be included as part of a removable consumable.

The output signal may be dependent on a time period of oscillations of the impulse response, such that the output signal is indicative of the resonant frequency of the impulse response.

The output circuit may comprise an edge detection circuit for identifying edges of said impulse response. The edge detection circuit may, for example, be provided as part of a charge time measurement unit (CTMU). The output signal may be based on a time period from a first edge of the impulse response and a second edge that is at least one complete cycle of said impulse response later. Furthermore, the output circuit may comprise a voltage ramp that is initiated when the first edge is identified and ends when the second edge is identified, wherein the output signal is based on an output of said voltage ramp.

In the event that an edge detection circuit is provided, the edge detection circuit may be configured to determine a propagation delay between an application of the impulse to the resonant circuit and a detection of the impulse response in response to the applied impulse, wherein the output signal is dependent on said propagation delay.

In some embodiments, an impulse detection circuit may be provided, wherein: the impulse generation circuit is configured to apply a first impulse and a second impulse to the resonant circuit, wherein the first impulse induces a first impulse response and the second impulse induces a second impulse response, wherein each impulse response has a resonant frequency; the impulse detection circuit is configured to determine a first time period from the end of a first wait period following the application of the first impulse to the end of a respective impulse response period of the impulse response and a second time period from the end of a second wait period following the application of the second impulse to the end of a respective impulse period of the impulse response; and the output circuit is configured to determine an impulse response period dependent (at least in part) on a sum of the difference between the first and second wait periods and the difference between the first and second time periods.

In embodiments including an impulse detection circuit, the impulse detection circuit may comprise a current source control circuit for initiating a current source at the end of the wait period following the application of a respective impulse and terminating the current source at the end of the impulse response period of the said impulse response. An analog-to-digital converter may be provided and coupled to the current source, wherein the analog-to-digital converter provides an output for use in determining the first and/or second time periods. The said impulse response period may be used to provide a temperature measurement of said susceptor.

The output signal may be dependent on a decay rate of voltage oscillations of the impulse response.

Some embodiments further comprise a processor for determining a Q-factor measurement of the impulse response, wherein the output signal is based on said Q-factor measurement. The processor for determining the Q-factor measurement of the impulse response may determine said Q-factor measurement by determining a number of oscillation cycles for the impulse response to halve (or approximately halve) in amplitude (or meet some other predefined relative value) and multiplying the determined number of cycles by a predetermined value. The said Q-factor may be used for determining one or more performance properties (based on the determined Q-factor).

Some embodiments further comprise a counter for determining a number of oscillations in a defined time period. The output circuit may be configured to provide the output signal to indicate whether or not a removable article is fitted within the apparatus on the basis of said determined number of oscillations.

The output signal may be used to provide a temperature measurement of said susceptor. The output signal may be scaled to provide said temperature measurement.

The impulse generation circuit may comprise a first switching arrangement used to generate the impulse by switching between positive and negative voltage sources.

The susceptor may be configured to aerosolize a substance in a heating mode of operation.

Some embodiments include a signal conditioning circuit to provide an offset to the impulse response.

A current sensor may be provided for measuring a current flowing in the inductive element.

A control module may be provided for determining a performance of said apparatus based on said output signal.

In a second aspect, this specification describes a system comprising: a plurality of resonant circuits, each resonant circuit comprising an inductive element (for inductively heating a susceptor) and a capacitor; an impulse generation circuit for applying an impulse to at least one of the plurality of resonant circuits, wherein the applied impulse induces an impulse response between the capacitor and the inductive element of the selected resonant circuit, wherein the impulse response has a resonant frequency; and an output circuit for providing an output signal dependent (at least in part) on one or more properties of the impulse response. The one or more properties of the impulse response may comprise a time period of voltage oscillations of the impulse response, such that the output signal is indicative of the resonant frequency of the impulse response.

In a third aspect, this specification describes an aerosol provision system for generating aerosol from an aerosolizable material, the aerosol provision system comprising an apparatus including of any of the features of the first aspect described above or a system including any of the features of the second aspect described above, wherein the aerosol provision system is configured to perform an action in response to receiving the output signal from the output circuit.

In a fourth aspect, this specification describes a method comprising: applying an impulse to a resonant circuit comprising an inductive element (for inductively heating a susceptor) and a capacitor, wherein the applied impulse induces an impulse response between the capacitor and the inductive element of the resonant circuit, wherein each impulse response has a resonant frequency; and generating an output signal dependent (at least in part) on one or more properties of the impulse response. The method may further comprise inductively heating a susceptor using said inductive element in order to aerosolize a substance in a heating mode of operation.

The output signal may be dependent on a time period of oscillations of the impulse response, wherein the output signal is indicative of the resonant frequency of the impulse response.

The impulse may be applied to the resonant circuit in a temperature measurement mode of operation.

Some embodiments further comprise determining a Q-factor measurement of the impulse response. Determining the Q-factor measurement of the impulse response may comprise determining a number of oscillation cycles for the impulse response to halve (or approximately halve) in amplitude (or meet some other predefined relative value) and multiplying the determined number of cycles by a predetermined value. Further, one or more performance properties may be determined based on the determined Q-factor.

The method may comprise: applying a first impulse to the resonant circuit to induce a first impulse response, wherein the first impulse occurs on a rising edge of a control signal; and applying a second impulse to the resonant circuit to induce a second impulse response, wherein the second impulse occurs on a falling edge of a control signal. Further, the method may comprise: generating a first output signal dependent on one or more properties of the first impulse response; and generating a second output signal dependent on one or more properties of the second impulse response.

In a fifth aspect, this specification describes computer-readable instructions which, when executed by computing apparatus, cause the computing apparatus to perform any method as described with reference to the fourth aspect.

In a sixth aspect, this specification describes a kit of parts comprising an article for use in a non-combustible aerosol generating system, wherein the non-combustible aerosol generating system comprises an apparatus including any of the features of the first aspect described above or a system including any of the features of the second aspect described above. The article may, for example, be a removable article comprising an aerosol generating material.

In a seventh aspect, this specification describes a computer program comprising instructions for causing an apparatus to perform at least the following: apply an impulse to a resonant circuit comprising an inductive element (for inductively heating a susceptor) and a capacitor, wherein the applied impulse induces an impulse response between the capacitor and the inductive element of the resonant circuit, wherein each impulse response has a resonant frequency; and generate an output signal dependent on one or more properties of the impulse response.

BRIEF DESCRIPTION OF THE DRAWINGS

Example embodiments will now be described, by way of example only, with reference to the following schematic drawings, in which:

FIG. 1 is a block diagram of a system in accordance with an example embodiment;

FIG. 2 shows a non-combustible aerosol provision device in accordance with an example embodiment;

FIG. 3 is a view of a non-combustible aerosol provision device in accordance with an example embodiment;

FIG. 4 is a view of an article for use with a non-combustible aerosol provision device in accordance with an example embodiment;

FIG. 5 is a block diagram of a circuit in accordance with an example embodiment;

FIG. 6 is a block diagram of a system in accordance with an example embodiment;

FIG. 7 is a flow chart showing an algorithm in accordance with an example embodiment;

FIGS. 8 and 9 are plots demonstrating example uses of example embodiments;

FIG. 10 is a flow chart showing an algorithm in accordance with an example embodiment;

FIG. 11 is a plot showing an example use of the algorithm of FIG. 10;

FIG. 12 is a flow chart showing an algorithm in accordance with an example embodiment;

FIG. 13 is a plot showing an example use of the algorithm of FIG. 12;

FIGS. 14 to 16 are block diagrams of systems in accordance with example embodiments;

FIG. 17 is a flow chart showing an algorithm in accordance with an example embodiment;

FIG. 18 shows plots demonstrating an example use of the algorithm of FIG. 17;

FIGS. 19 to 21 are flow charts showing algorithms in accordance with example embodiments;

FIGS. 22 to 24 are plots showing outputs in accordance with example embodiments;

FIG. 25 is a block diagram of a system in accordance with an example embodiment;

FIG. 26 is a flow chart showing an algorithm in accordance with an example embodiment;

FIG. 27 is a plot demonstrating example uses of example embodiments;

FIG. 28 is a block diagram of a circuit switching arrangement in accordance with an example embodiment;

FIG. 29 is a block diagram of a circuit switching arrangement in accordance with an example embodiment; and FIGS. 30 and 31 are flow charts showing algorithms in accordance with example embodiments.

DETAILED DESCRIPTION OF THE DRAWINGS

As used herein, the term "delivery system" is intended to encompass systems that deliver a substance to a user, and includes:

combustible aerosol provision systems, such as cigarettes, cigarillos, cigars, and tobacco for pipes or for roll-yourown or for make-your-own cigarettes (whether based on tobacco, tobacco derivatives, expanded tobacco, reconstituted tobacco, tobacco substitutes or other smokable material);

non-combustible aerosol provision systems that release compounds from an aerosolizable material without combusting the aerosolizable material, such as electronic cigarettes, tobacco heating products, and hybrid systems to generate aerosol using a combination of aerosolizable materials;

articles comprising aerosolizable material and configured to be used in one of these non-combustible aerosol provision systems; and aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

FIG. 1 is a block diagram of a system, indicated generally by the reference numeral 10, in accordance with an example embodiment. System 10 comprises a power source in the form of a direct current (DC) voltage supply 11, a switching arrangement 13, a resonant circuit 14, a susceptor arrangement 16, and a control circuit 18. The switching arrangement 13 and the resonant circuit 14 may be coupled together in an inductive heating arrangement 12.

The resonant circuit 14 may comprise a capacitor and one or more inductive elements for inductively heating the susceptor arrangement 16 to heat an aerosol generating material. Heating the aerosol generating material may thereby generate an aerosol.

The switching arrangement 13 may enable an alternating current to be generated from the DC voltage supply 11. The alternating current may flow through the one or more inductive elements and may cause the heating of the susceptor arrangement 16. The switching arrangement may comprise a plurality of transistors. Example DC-AC converters include H-bridge or inverter circuits, examples of which are discussed below. It should be noted that the provision of a DC voltage supply 11 from which a pseudo AC signal is generated is not an essential feature; for example, a controllable AC supply or an AC-AC converter may be provided. Thus, an AC input could be provided (such as from a mains supply or an inverter).

Example arrangements of the switching arrangement 13 and the resonant circuit 14 are discussed in greater detail below.

It should be noted that the DC voltage supply 11 of the system 10 is not essential to all example embodiments. For example, an AC input could be provided (such as from a mains supply or from an inverter).

Figure 2:
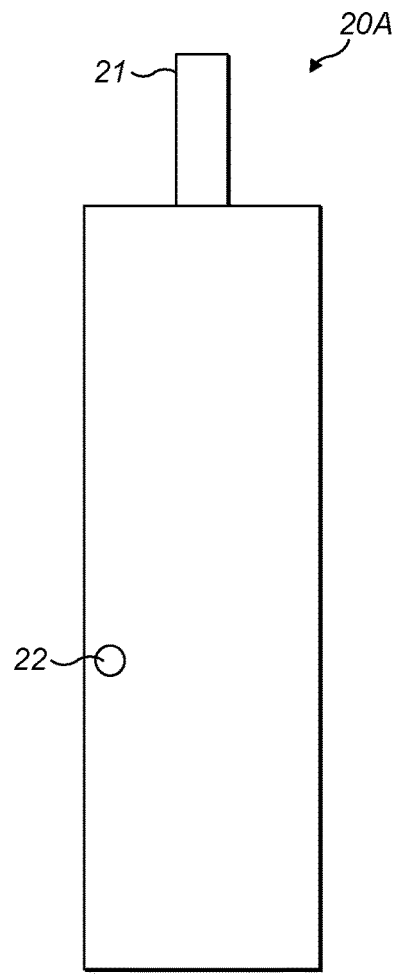
Figure 3:
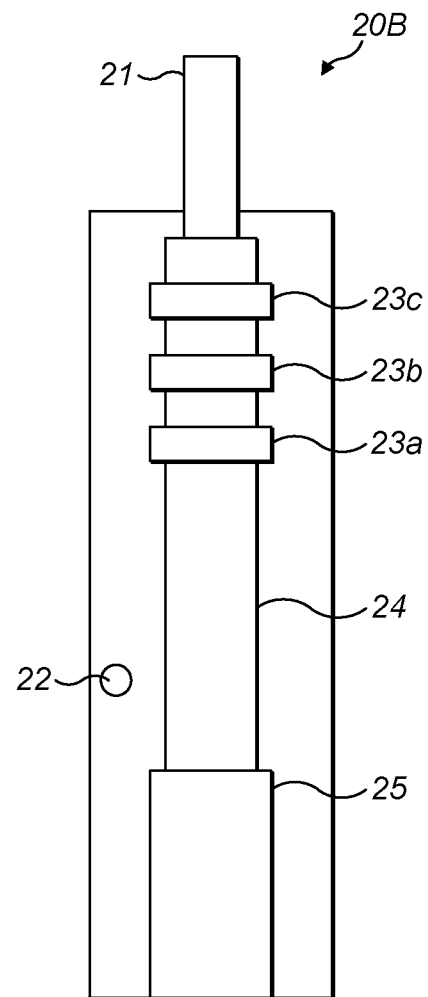

FIGS. 2 and 3 show a non-combustible aerosol provision device, indicated generally by the reference numeral 20, in accordance with an example embodiment. FIG. 2 is a perspective illustration of an aerosol provision device 20A with an outer cover. The aerosol provision device 20A may comprise a replaceable article 21 that may be inserted in the aerosol provision device 20A to enable heating of a susceptor (which may be comprised within the article 21, as discussed further below). The aerosol provision device 20A may further comprise an activation switch 22 that may be used for switching on or switching off the aerosol provision device 20A.

FIG. 3 depicts an aerosol provision device 20B with the outer cover removed. The aerosol generating device 20B comprises the article 21, the activation switch 22, a plurality of inductive elements 23a, 23b, and 23c, and one or more air tube extenders 24 and 25. The one or more air tube extenders 24 and 25 may be optional.

The plurality of inductive elements 23a, 23b, and 23c may each form part of a resonant circuit, such as the resonant circuit 14. The inductive element 23a may comprise a helical inductor coil. In one example, the helical inductor coil is made from Litz wire/cable which is wound in a helical fashion to provide the helical inductor coil. Many alternative inductor formations are possible, such as inductors formed within a printed circuit board. The inductive elements 23b and 23c may be similar to the inductive element 23a. The use of three inductive elements 23a, 23b and 23c is not essential to all example embodiments. Thus, the aerosol generating device 20 may comprise one or more inductive elements.

A susceptor may be provided as part of the article 21. In an example embodiment, when the article 21 is inserted in aerosol generating device 20, the aerosol generating device 20 may be turned on due to the insertion of the article 21. This may be due to detecting the presence of the article 21 in the aerosol generating device using an appropriate sensor (e.g., a light sensor) or, in cases where the susceptor forms a part of the article 21, by detecting the presence of the susceptor using the resonant circuit 14, for example. When the aerosol generating device 20 is turned on, the inductive elements 23 may cause the article 21 to be inductively heated through the susceptor. In an alternative embodiment, the susceptor may be provided as part of the aerosol generating device 20 (e.g. as part of a holder for receiving the article 21).

Figure 4:
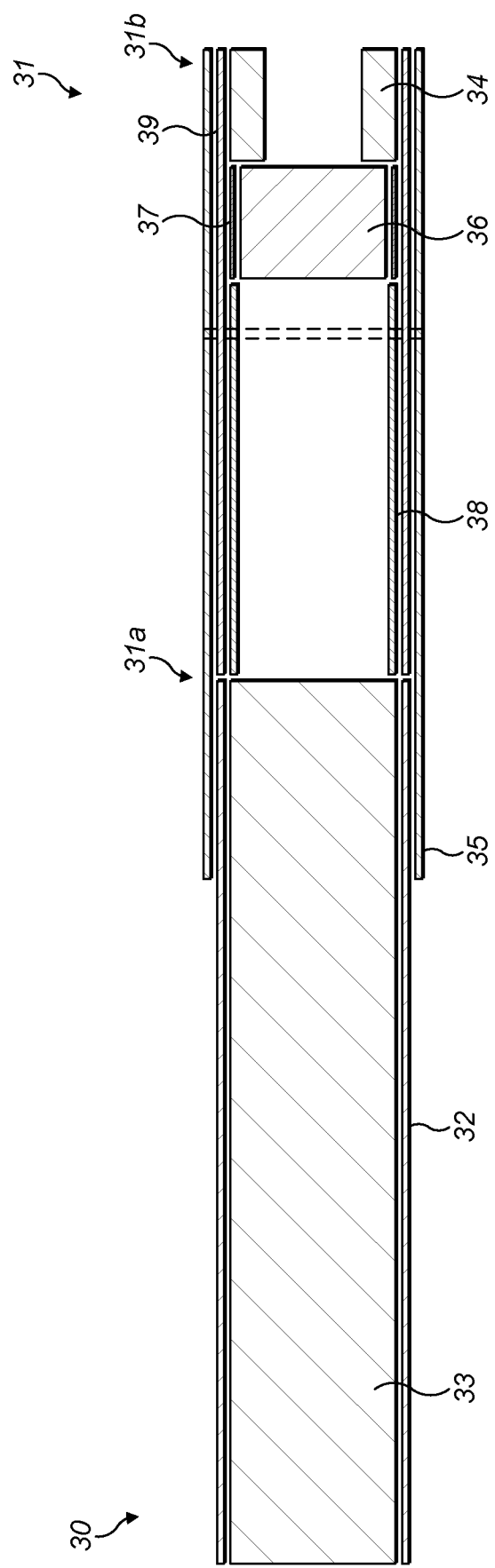

FIG. 4 is a view of an article, indicated generally by the reference numeral 30, for use with a non-combustible aerosol provision device in accordance with an example embodiment. The article 30 is an example of the replaceable article 21 described above with reference to FIGS. 2 and 3.

The article 30 comprises a mouthpiece 31, and a cylindrical rod of aerosol generating material 33, in the present case tobacco material, connected to the mouthpiece 31. The aerosol generating material 33 provides an aerosol when heated, for instance within a non-combustible aerosol generating device, such as the aerosol generating device 20, as described herein. The aerosol generating material 33 is wrapped in a wrapper 32. The wrapper 32 can, for instance, be a paper or paper-backed foil wrapper. The wrapper 32 may be substantially impermeable to air.

In one embodiment, the wrapper 32 comprises aluminum foil. Aluminum foil has been found to be particularly effective at enhancing the formation of aerosol within the aerosol generating material 33. In one example, the aluminum foil has a metal layer having a thickness of about 6 μm. The aluminum foil may have a paper backing. However, in alternative arrangements, the aluminum foil can have other thicknesses, for instance between 4 μm and 16 μm in thickness. The aluminum foil also need not have a paper backing, but could have a backing formed from other materials, for instance to help provide an appropriate tensile strength to the foil, or it could have no backing material. Metallic layers or foils other than aluminum can also be used. Moreover, it is not essential that such metallic layers are provided as part of the article 30; for example, such a metallic layer could be provided as part of the apparatus 20.

The aerosol generating material 33, also referred to herein as an aerosol generating substrate 33, comprises at least one aerosol forming material. In the present example, the aerosol forming material is glycerol. In alternative examples, the aerosol forming material can be another material as described herein or a combination thereof. The aerosol forming material has been found to improve the sensory performance of the article, by helping to transfer compounds such as flavor compounds from the aerosol generating material to the consumer.

As shown in FIG. 4, the mouthpiece 31 of the article 30 comprises an upstream end 31a adjacent to an aerosol generating substrate 33 and a downstream end 31b distal from the aerosol generating substrate 33. The aerosol generating substrate may comprise tobacco, although alternatives are possible.

The mouthpiece 31, in the present example, includes a body of material 36 upstream of a hollow tubular element 34, in this example adjacent to and in an abutting relationship with the hollow tubular element 34. The body of material 36 and hollow tubular element 34 each define a substantially cylindrical overall outer shape and share a common longitudinal axis. The body of material 36 is wrapped in a first plug wrap 37. The first plug wrap 37 may have a basis weight of less than 50 gsm, such as between about 20 gsm and 40 gsm.

In the present example the hollow tubular element 34 is a first hollow tubular element 34 and the mouthpiece includes a second hollow tubular element 38, also referred to as a cooling element, upstream of the first hollow tubular element 34. In the present example, the second hollow tubular element 38 is upstream of, adjacent to and in an abutting relationship with the body of material 36. The body of material 36 and second hollow tubular element 38 each define a substantially cylindrical overall outer shape and share a common longitudinal axis. The second hollow tubular element 38 is formed from a plurality of layers of paper which are parallel wound, with butted seams, to form the tubular element 38. In the present example, first and second paper layers are provided in a two-ply tube, although in other examples 3, 4 or more paper layers can be used forming 3, 4 or more ply tubes. Other constructions can be used, such as spirally wound layers of paper, cardboard tubes, tubes formed using a papier-mâché type process, molded or extruded plastic tubes or similar. The second hollow tubular element 38 can also be formed using a stiff plug wrap and/or tipping paper as the second plug wrap 39 and/or tipping paper 35 described herein, meaning that a separate tubular element is not required.

The second hollow tubular element 38 is located around and defines an air gap within the mouthpiece 31 which acts as a cooling segment. The air gap provides a chamber through which heated volatilized components generated by the aerosol generating material 33 may flow. The second hollow tubular element 38 is hollow to provide a chamber for aerosol accumulation yet rigid enough to withstand axial compressive forces and bending moments that might arise during manufacture and whilst the article 21 is in use. The second hollow tubular element 38 provides a physical displacement between the aerosol generating material 33 and the body of material 36. The physical displacement provided by the second hollow tubular element 38 will provide a thermal gradient across the length of the second hollow tubular element 38.

Of course, the article 30 is provided by way of example only. The skilled person will be aware of many alternative arrangements of such an article that could be used in the systems described herein.

Figure 5:
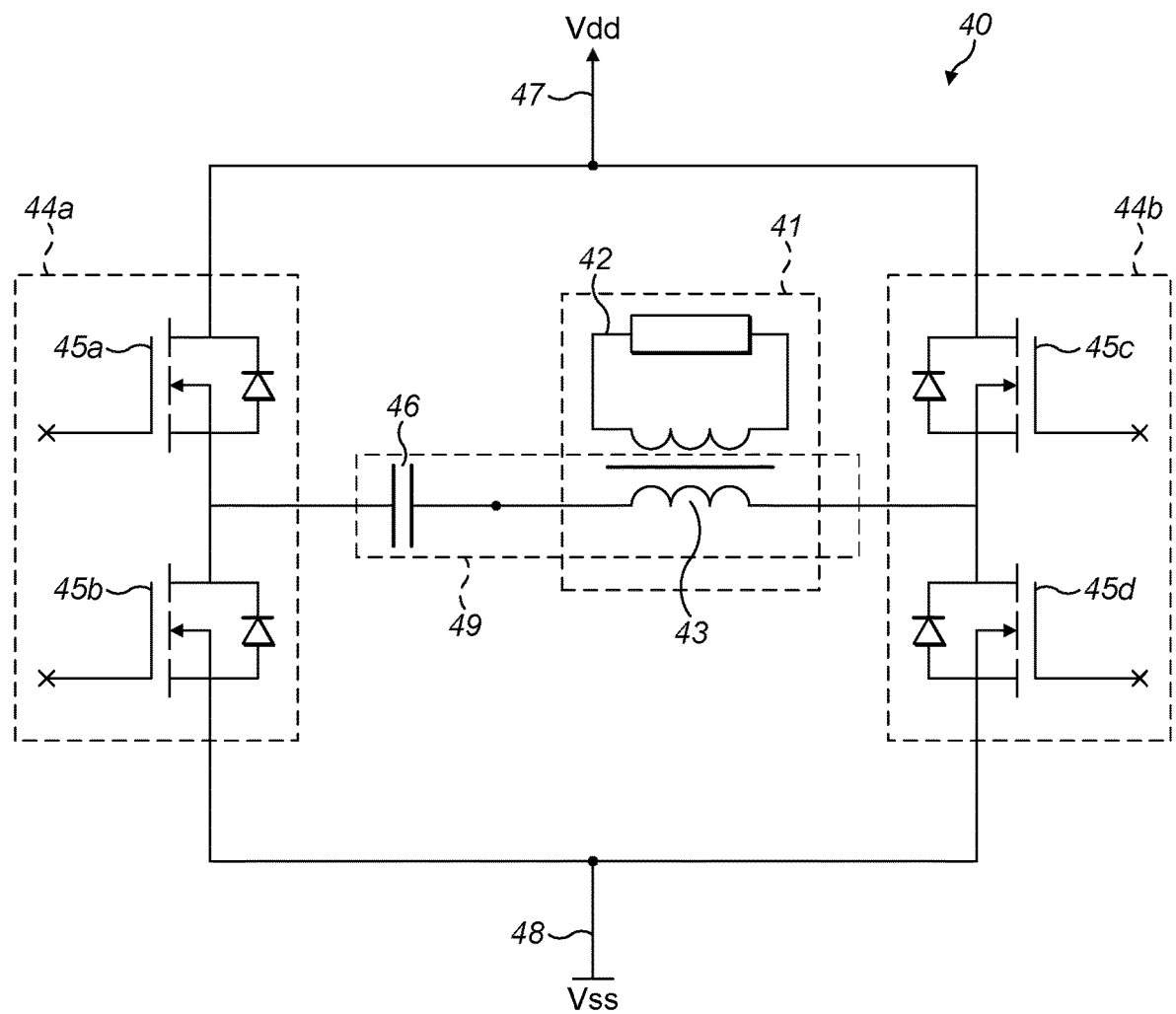

FIG. 5 is a block diagram of a circuit, indicated generally by the reference numeral 40, in accordance with an example embodiment. The circuit 40 comprises a positive terminal 47 and a negative (ground) terminal 48 (that are an example implementation of the DC voltage supply 11 of the system 10 described above). The circuit 40 comprises a switching arrangement 44 (implementing the switching arrangement 13 described above), where the switching arrangement 44 comprises a bridge circuit (e.g. an H-bridge circuit, such as an FET H-bridge circuit). The switching arrangement 44 comprises a first circuit branch 44a and a second circuit branch 44b, where the first circuit branch 44a and the second circuit branch 44b may be coupled by a resonant circuit 49 (implementing the resonant circuit 14 described above). The first circuit branch 44a comprises switches 45a and 45b, and the second circuit branch 44b comprises switches 45c and 45d. The switches 45a, 45b, 45c, and 45d may be transistors, such as field-effect transistors (FETs), and may receive inputs from a controller, such as the control circuit 18 of the system 10. The resonant circuit 49 comprises a capacitor 46 and an inductive element 43 such that the resonant circuit 49 may be an LC resonant circuit. The circuit 40 further shows a susceptor equivalent circuit 42 (thereby implementing the susceptor arrangement 16). The susceptor equivalent circuit 42 comprises a resistance and an inductive element that indicate the electrical effect of an example susceptor arrangement 16. When a susceptor is present, the susceptor arrangement 42 and the inductive element 43 may act as a transformer 41. Transformer 41 may produce a varying magnetic field such that the susceptor is heated when the circuit 40 receives power. During a heating operation, in which the susceptor arrangement 16 is heated by the inductive arrangement, the switching arrangement 44 is driven (e.g., by control circuit 18) such that each of the first and second branches are coupled in turn such that an alternating current is passed through the resonant circuit 14. The resonant circuit 14 will have a resonant frequency, which is based in part on the susceptor arrangement 16, and the control circuit 18 may be configured to control the switching arrangement 44 to switch at the resonance frequency or a frequency close to the resonant frequency. Driving the switching circuit at or close to resonance helps improve efficiency and reduces the energy being lost to the switching elements (which causes unnecessary heating of the switching elements). In an example in which the article 21 comprising an aluminum foil is to be heated, the switching arrangement 44 may be driven at a frequency of around 2.5 MHz. However, in other implementations, the frequency may, for example, be anywhere between 500 kHz to 4 MHz.

A susceptor is a material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

In one embodiment, the susceptor is in the form of a closed circuit. It has been found in some embodiments that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 6:
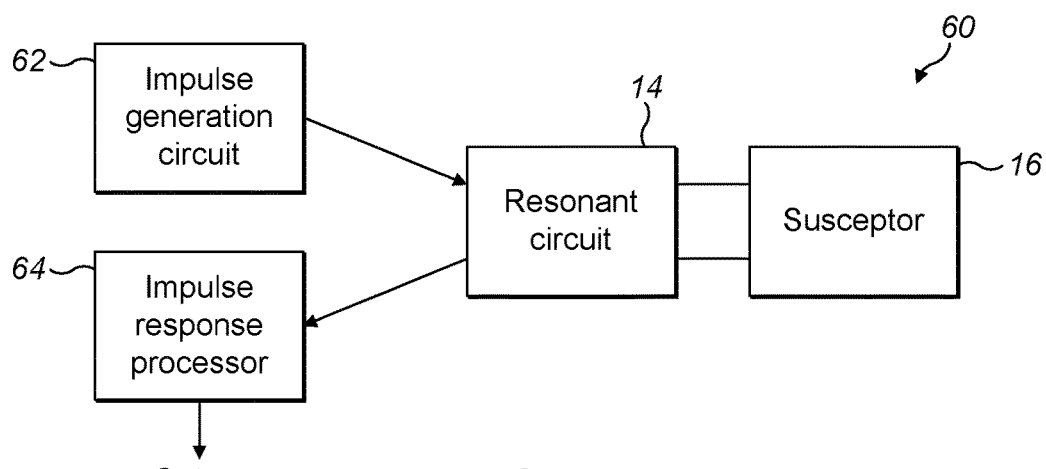

FIG. 6 is a block diagram of a system, indicated generally by the reference numeral 60, in accordance with an example embodiment. The system 60 comprises the resonant circuit 14 and the susceptor 16 of the system 10 described above. The system further comprises an impulse generation circuit 62 and an impulse response processor 64. The impulse generation circuit 62 and the impulse response processor 64 may be implemented as part of the control circuit 18 of the system 10.

The impulse generation circuit 62 may be implemented using a first switching arrangement (such as an H-bridge circuit) to generate the impulse by switching between positive and negative voltage sources. For example, the switching arrangement 44 described above with reference to FIG. 5 may be used. As described further below, the impulse generation circuit 62 may generate an impulse by changing the switching states of the FETs of the switching arrangement 44 from a condition where the switches 45b and 45d are both on (such that the switching arrangement is grounded) and the switches 45a and 45b are off, to a state where the switch states of one of the first and second circuit branches 44a and 44b are reversed. The impulse generation circuit 62 may alternatively be provided using a pulse width modulation (PWM) circuit. Other impulse generation arrangements are also possible.

The impulse response processor 64 may determine one or more performance metrics (or characteristics) of the resonant circuit 14 and the susceptor 16 based on the impulse response. Such performance metrics include properties of an article (such as the removable article 21), presence or absence of such an article, type of article, temperature of operation etc.

Figure 7:
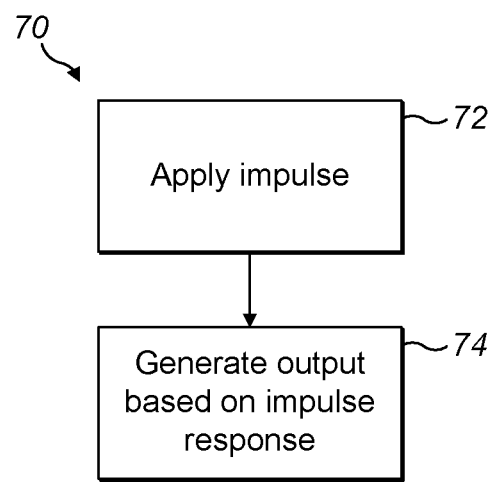

FIG. 7 is a flow chart showing an algorithm, indicated generally by the reference numeral 70, in accordance with an example embodiment. The algorithm 70 shows an example use of the system 60.

Figure 8:
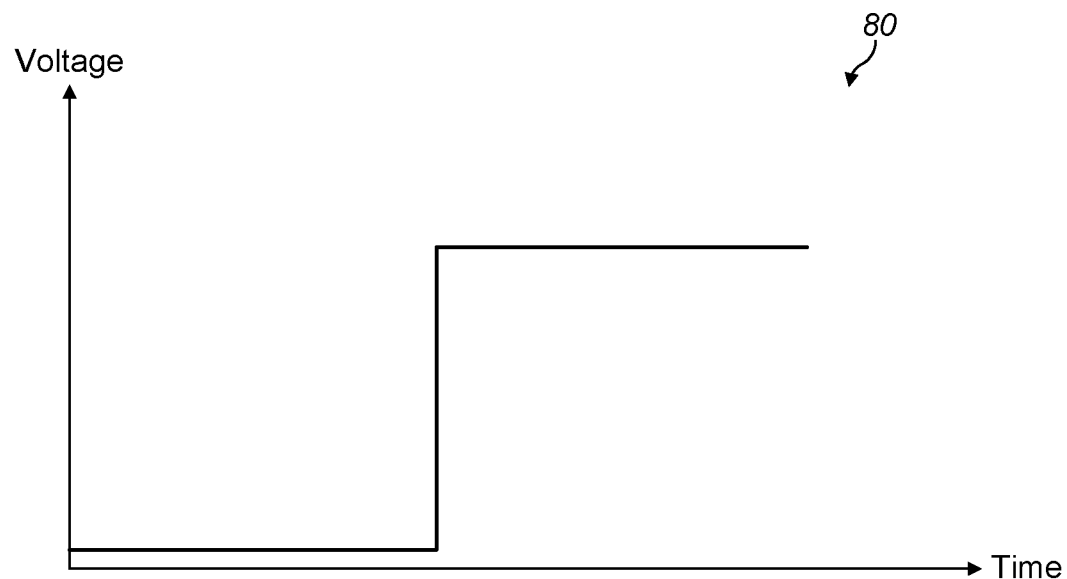

The algorithm 70 starts at operation 72 where an impulse (generated by the impulse generation circuit 62) is applied to the resonant circuit 14. FIG. 8 is a plot, indicated generally by the reference numeral 80, showing an example impulse that might be applied in the operation 72.

The impulse may be applied to the resonant circuit 14. Alternatively, in systems having multiple inductive elements (such as non-combustible aerosol arrangement 20 described above with reference to FIGS. 2 and 3), the impulse generation circuit 62 may select one of a plurality of resonant circuits, each resonant circuit comprising an inductive element for inductively heating a susceptor and a capacitor, wherein the applied impulse induces an impulse response between the capacitor and the inductive element of the selected resonant circuit.

Figure 9:
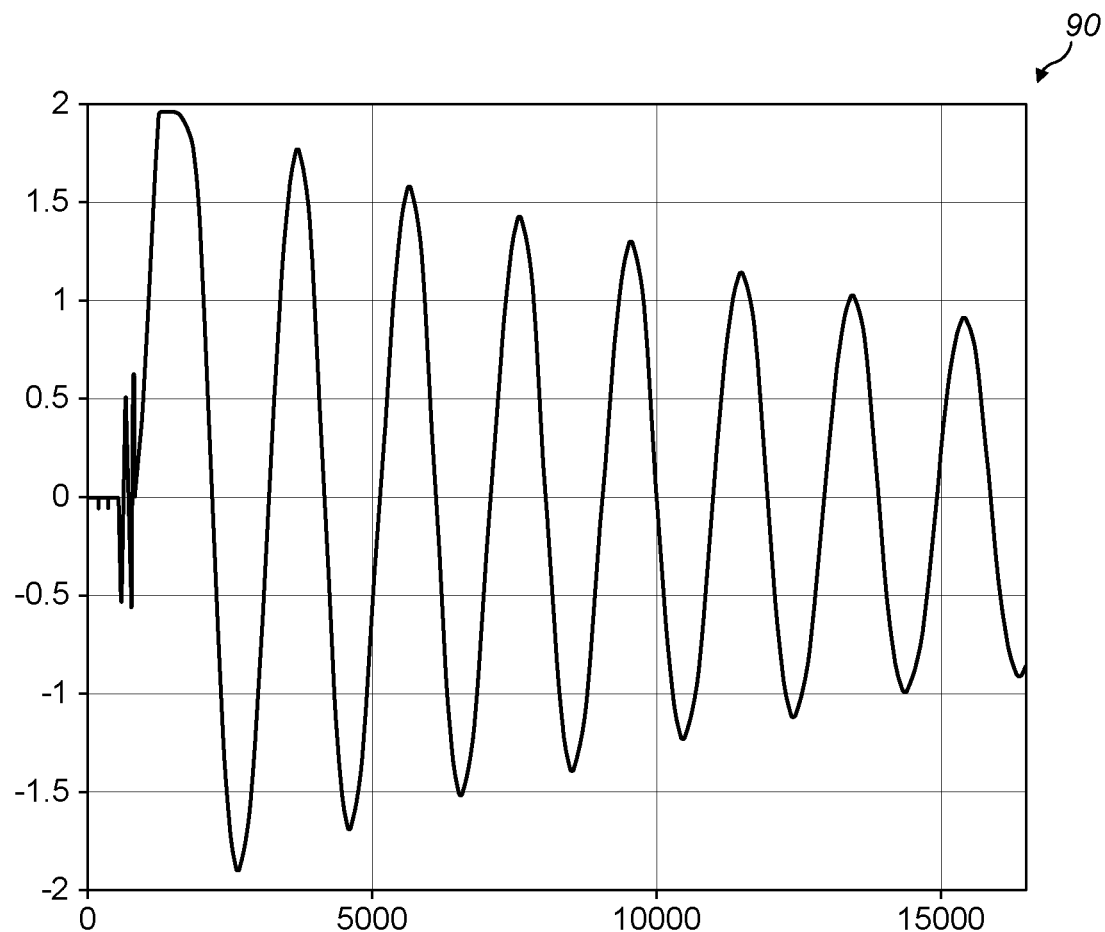

At operation 74, an output is generated (by the impulse response processor 64) based on an impulse response that is generated in response to the impulse applied in operation 72. FIG. 9 is a plot, indicated generally by the reference numeral 90, showing an example impulse response that might be received at the impulse response processor 64 in response to the impulse 80. As shown in FIG. 9, the impulse response may take the form of a ringing resonance. The impulse response is a result of charge bouncing between the inductor(s) and capacitor of the resonant circuit 14. In one arrangement, no heating of the susceptor is caused as a result. That is, the temperature of the susceptor remains substantially constant (e.g., within ±1° C. or ±0.1° C. of the temperature prior to applying the impulse).

At least some of the properties of the impulse response (such as frequency and/or decay rate of the impulse response) provide information regarding the system to which the impulse is applied. Thus, as discussed further below, the system 60 can be used to determine one or more properties of the system to which the impulse is applied. For example one or more performance properties, such as fault conditions, properties of an inserted article 21, presence or absence of such an article, whether the article 21 is genuine, temperature of operation etc., can be determined based on output signal derived from an impulse response. The system 60 may use the determined one or more properties of the system to perform further actions (or prevent further actions if so desired) using the system 10, for example, to perform heating of the susceptor arrangement 16. For instance, based on the determined temperature of operation, the system 60 can choose what level of power is to be supplied to the induction arrangement to cause further heating of the susceptor arrangement, or whether power should be supplied at all. For some performance properties, such as fault conditions or determining whether the article 21 is genuine, a measured property of the system (as measured using the impulse response) can be compared to an expected value or range of values for the property, and actions taken by the system 60 are performed on the basis of the comparison.

Figure 10:
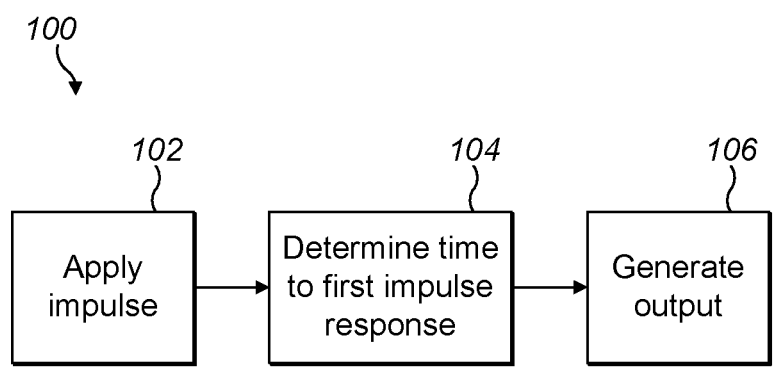

FIG. 10 is a flow chart showing an algorithm, indicated generally by the reference numeral 100, in accordance with an example embodiment. At operation 102 of the algorithm 100, an impulse is applied to the resonant circuit 14 by the impulse generation circuit 62. At operation 104, a time to a first impulse response induced in response to the applied impulse is determined by the impulse response processor 64. Finally, at operation 106, an output is generated (based on the time to the first impulse response).

Figure 11:
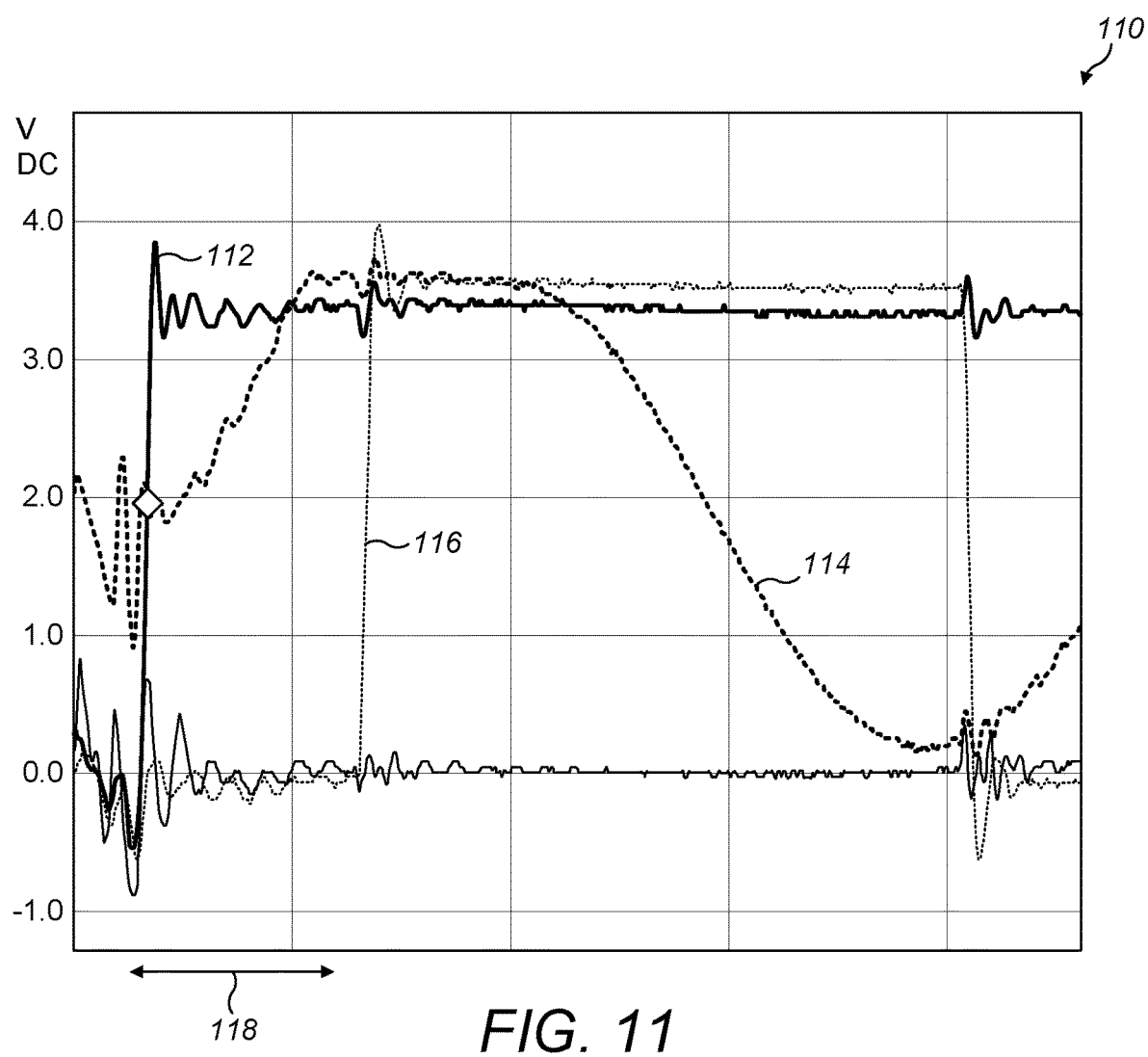

FIG. 11 is a plot, indicated generally by the reference numeral 110, showing an example use of the algorithm 100. The plot 110 shows an impulse 112 applied to the resonant circuit 14 by the impulse generation circuit 62. The application of the impulse 112 implements the operation 102 of the algorithm 100. An impulse response 114 is induced in response to the applied impulse. The impulse 112 may be held in its final state (high in the plot 110) for the duration of the measurement, but this is not essential. For example, a high-low impulse could be applied (and then held low).

The impulse response processor 64 generates a signal 116 indicating edges of the impulse response 114. As discussed further below, the signal 116 may be generated by a comparator and there may be a delay between the occurrence of the edge and the generation of the signal. If consistent, that delay may not be significant to the processing.

At operation 104 of the algorithm 100, a time to the first impulse response is determined. That time is the time between the impulse 112 and the first rise of the signal 116. An example time is indicated by the arrow 118 in FIG. 11.

At operation 106 of the algorithm 100, an output is generated based on the determined time period 118. In some embodiments, the time period 118 is temperature dependent. Accordingly, the output generated in operation 106 may be used to provide a temperature estimate.

Figure 12:
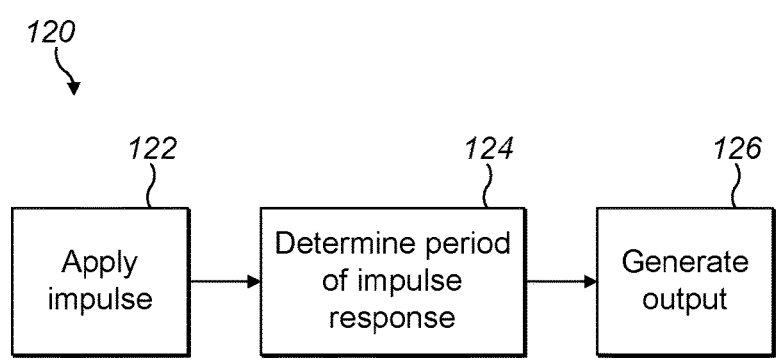

FIG. 12 is a flow chart showing an algorithm, indicated generally by the reference numeral 120, in accordance with an example embodiment. At operation 122 of the algorithm 120, an impulse is applied to the resonant circuit 14 by the impulse generation circuit 62. Thus, the operation 122 is the same as the operation 102 described above.

At operation 124 of the algorithm 120, a period of an impulse response induced in response to the applied impulse is determined by the impulse response processor 64. Finally, at operation 126, an output is generated (based on the determined period of the impulse response).

Figure 13:
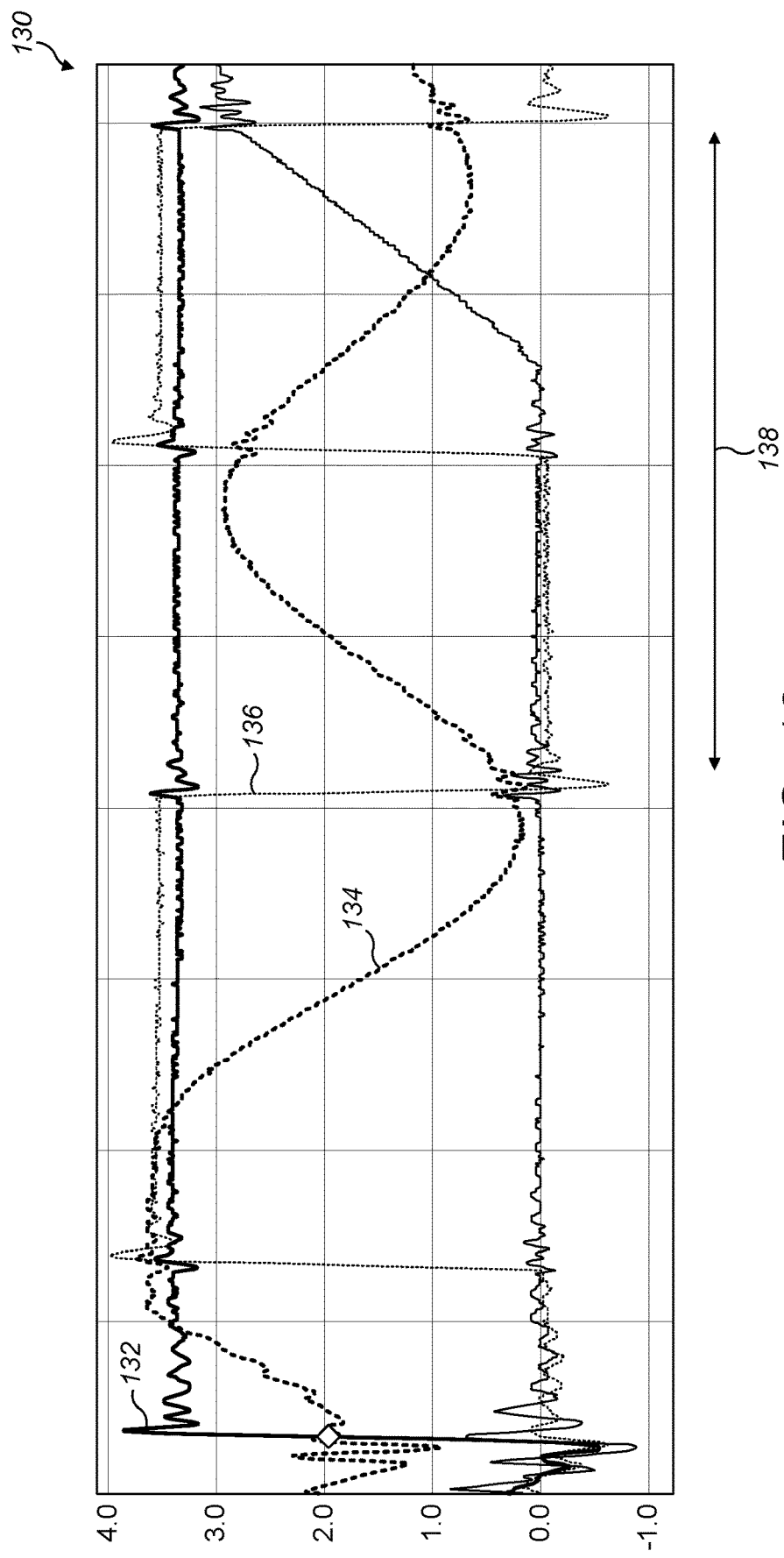

FIG. 13 is a plot, indicated generally by the reference numeral 130, showing an example use of the algorithm 120. The plot 130 shows an impulse 132 applied to the resonant circuit 14 by the impulse generation circuit 62. The application of the impulse 132 implements the operation 122 of the algorithm 100. An impulse response 134 is induced in response to the applied impulse. The impulse 132 may be held in its final state (high in the plot 130) for the duration of the measurement, but this is not essential. For example, a high-low impulse could be applied (and then held low).

The impulse response processor 64 generates a signal 136 indicating edges of the impulse response 134. As discussed further below, the signal 136 may be generated by a comparator and there may be a delay between the occurrence of the edge and the generation of the signal. If consistent, that delay may not be significant to the processing.

At operation 124 of the algorithm 120, a period of the impulse response is determined. An example period is indicated by the arrow 138 in FIG. 13.

At operation 126 of the algorithm 100, an output is generated based on the determined period 138. Thus, the output signal is based on a time period from a first edge of the impulse and a second edge that is one complete cycle of said impulse response later. The output signal is therefore dependent on a time period of voltage oscillations of the impulse response, such that the output signal is indicative of the resonant frequency of the impulse response.

In some embodiments, the period 138 is temperature dependent. In one example implementation, a change in temperature of 250 degrees centigrade resulted in a change in the period 138 of 13 ns. Accordingly, the output generated in operation 126 may be used to provide a temperature estimate of the susceptor 16 based on the measured period. That is, the period 138 of the impulse response 134 (as determined from signal 136 in the present example) may be used to determine the temperature of the susceptor 16, e.g. by use of a look-up table determined in advance.

Figure 14:
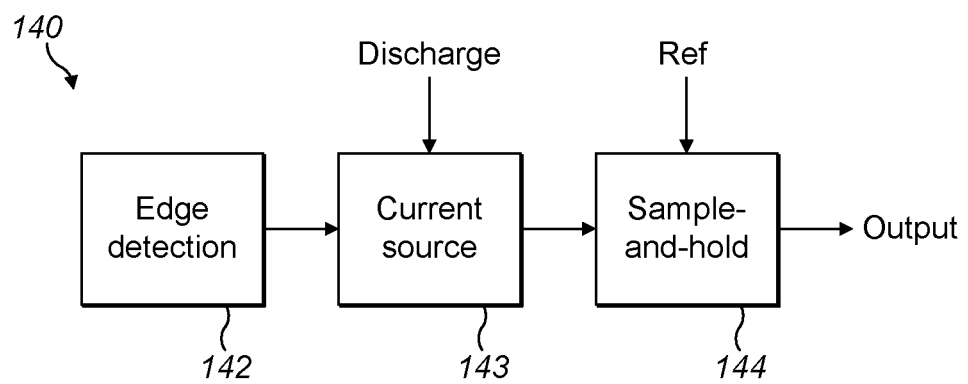

FIG. 14 is a block diagram of a system, indicated generally by the reference numeral 140, in accordance with example embodiments. The system 140 may be used to implement the operations 106 and 126 of the algorithms 100 and 120 described above.

The system 140 comprises an edge detection circuit 142, a current source 143 and a sample-and-hold circuit 144.

The edge detection circuit 142 can be used to determine edges of signals, such as the impulse response signals 114 and 134 described above. Accordingly, the edge detection circuit 142 may generate the signals 116 and 136 described above. The edge detection circuit 142 may, for example, be implemented using a comparator or some similar circuit.

The edge detection circuit 142 provides an enable signal to the current source 143. Once enabled, the current source 143 can be used to generate an output (such as a voltage output across a capacitor). The current source 143 has a discharge input that acts as a reset input. The current source output can be used to indicate a time duration since an output of edge detection circuit 142 enabled the current source 143. Thus, the current source output can be used as an indication of time duration (e.g. pulse duration).

The sample-and-hold circuit 144 can be used to generate an output signal based on the output of the current source 143 at a particular time. The sample-and-hold circuit 144 may have a reference input. The sample-and-hold circuit 144 can be used as an analog-to-digital converter (ADC) that converts a capacitor voltage into a digital output. In other systems, any other suitable electronic components, such as a voltmeter, may be used to measure the voltage.

The system 140 may be used in an example implementation of the algorithm 100. For example, the edge detection circuit 142 may detect an edge of the impulse response 114, thereby generating the signal 116. The edge detection circuit can enable the current source 143 when the impulse is generated until the signal 116 is generated. Thus, the edge detection circuit 142 can be configured to determine a propagation delay between an application of an impulse to the resonant circuit 14. The current source may therefore be enabled during the time period 118 indicated in FIG. 11. The output of the sample-and-hold circuit 144 can therefore be dependent on the time period 118.

Similarly, the system 140 may be used in an implementation of the algorithm 120. For example, the edge detection circuit 142 may detect successive edges of the impulse response 134, thereby generating the signal 136. The edge detection circuit can enable the current source 143 for the period between two edges. The current source may therefore be enabled during the time period 138 indicated in FIG. 13. The output of the sample-and-hold circuit 144 can therefore be dependent on the time period 138.

The system 140 may be implemented using a charge time measurement unit (CTMU), such as an integrated CTMU.

Figure 15:
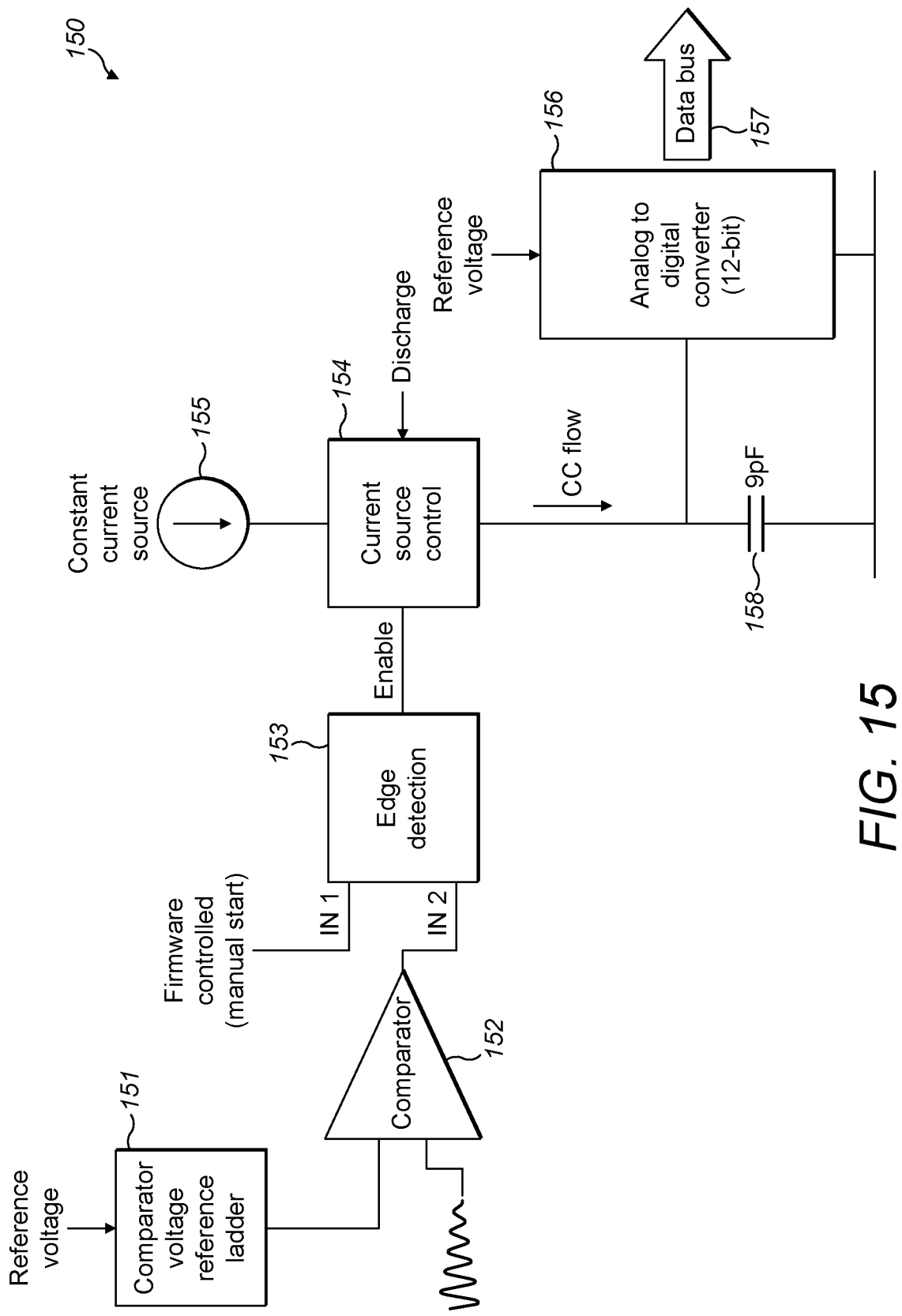

FIG. 15 is a block diagram of a system, indicated generally by the reference numeral 150, in accordance with example embodiments. The system 150 shows features of a CTMU that may be used in example embodiments.

The system 150 comprises a reference voltage generator 151, a comparator 152, an edge detection module 153, a current source controller 154, a constant current source 155, an analog-to-digital converter 156 providing a data output 157 to a data bus, and an external capacitor 158. As discussed further below, the voltage generator 151, the comparator 152 and the edge detection module 153 may be used to implement the edge detection circuit 142 described above, the current source controller 154 and the constant current source 155 may be used to implement the current source 143 described above, and the analog-to-digital converter 156 may be used to implement the sample-and-hold circuit 144 described above.

The impulse responses generated in the operations 104 and 124 described above are provided to an input of the comparator 152, where the impulse response is compared with the output of the reference voltage generator 151. The comparator may output a logical high signal when the impulse response is greater than the reference voltage and a logical low signal when the impulse response is less than the reference voltage (or vice versa). The output of the comparator 152 is fed into an input (IN2) of the edge detection circuit 153. The other input of the edge detection circuit 153 (IN1) is a firmware controlled input. The edge detection circuit 153 (which may simply be a selectable RS flip-flop) generates an enable signal dependent on the identification of edges at the output of the comparator 152. The edge detection circuit 153 may be programmable such that the nature of edges that are to be detected (e.g. rising or falling edges, first edges etc.) can be indicated.

The enable signal is provided as an input to the current source controller 154. When enabled, the current source controller 154 applies a current (from the constant current source 155) that is used to charge the external capacitor 158. The discharge input to the current source controller can be used to discharge the external capacitor 158 (and effectively reset the stored charge on the capacitor to a baseline value).

The analog-to-digital converter 156 is used to determine the voltage across the external capacitor 158, which voltage is used to provide the data output 157. In this way, the system 150 provides a voltage ramp that is initialized on an identified edge and ends when a second edge is identified.

Figure 16:
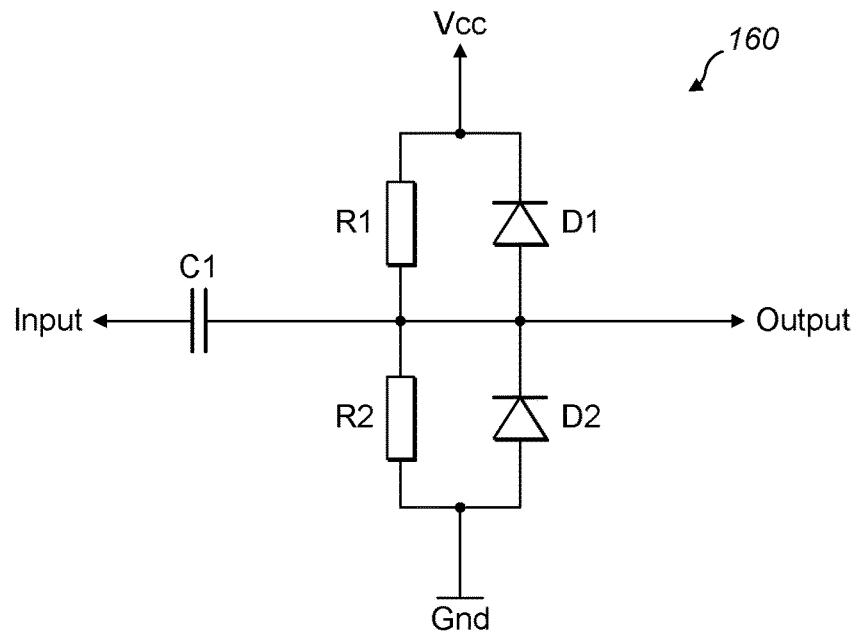

FIG. 16 is a block diagram of a circuit, such as a signal conditioning circuit, indicated generally by the reference numeral 160, in accordance with example embodiments. The circuit 160 may be used to provide an offset to an impulse response to enable the comparator 152 to correctly compare the impulse response to the output of the reference voltage generator 151. The offset may, for example, be programmable such that the threshold level of the comparator circuit 152 is at a mid-point of the offset pulse response.

The signal conditioning circuit 160 has at least three purposes. The first is to provide protection from voltage spikes. This is achieved by the stacked diodes and a resistor (not shown) between the mid-points of the diodes and the output. The second is to provide signal decoupling; this is the purpose of the capacitor at the input of the circuit 160. The third, as described above, is to set the offset voltage of the impulse response to match that of the input of the comparator 152 to ensure that the comparator triggers at the mid-point of the impulse response. This is achieved using the resistors R1 and R2.

Figure 17:
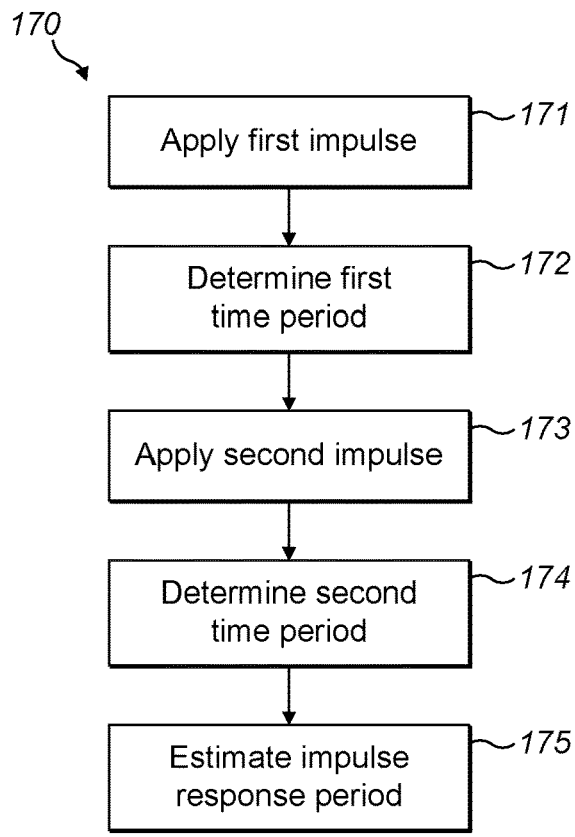

The algorithms 100 and 120 are two of many example algorithms in accordance with the principles described herein. In some embodiments, the algorithm 100 may be inaccurate. Moreover, in some embodiments, the algorithm 120 can require a lengthy time determination, which can reduce the available resolution of a digital output. FIG. 17 is a flow chart showing an algorithm, indicated generally by the reference numeral 170, in accordance with another example use of the system 60.

At operation 171 of the algorithm 170, a first impulse is applied to the resonant circuit 14 by the impulse generation circuit 62. At operation 172, a first impulse response period of an impulse response induced in response to the first applied impulse is determined by the impulse response processor 64.

At operation 173, a second impulse is applied to the resonant circuit 14 by the impulse generation circuit 62. At operation 174, a second impulse response period of an impulse response induced in response to the second applied impulse is determined by the impulse response processor 64.

Finally, at operation 175, an output is generated based on an estimated impulse response period. The estimated impulse response period may, for example, be indicative of a temperature of operation. As discussed in detail below, the estimated impulse response period is derived from the time periods determined in operations 172 and 174.

Figure 18:
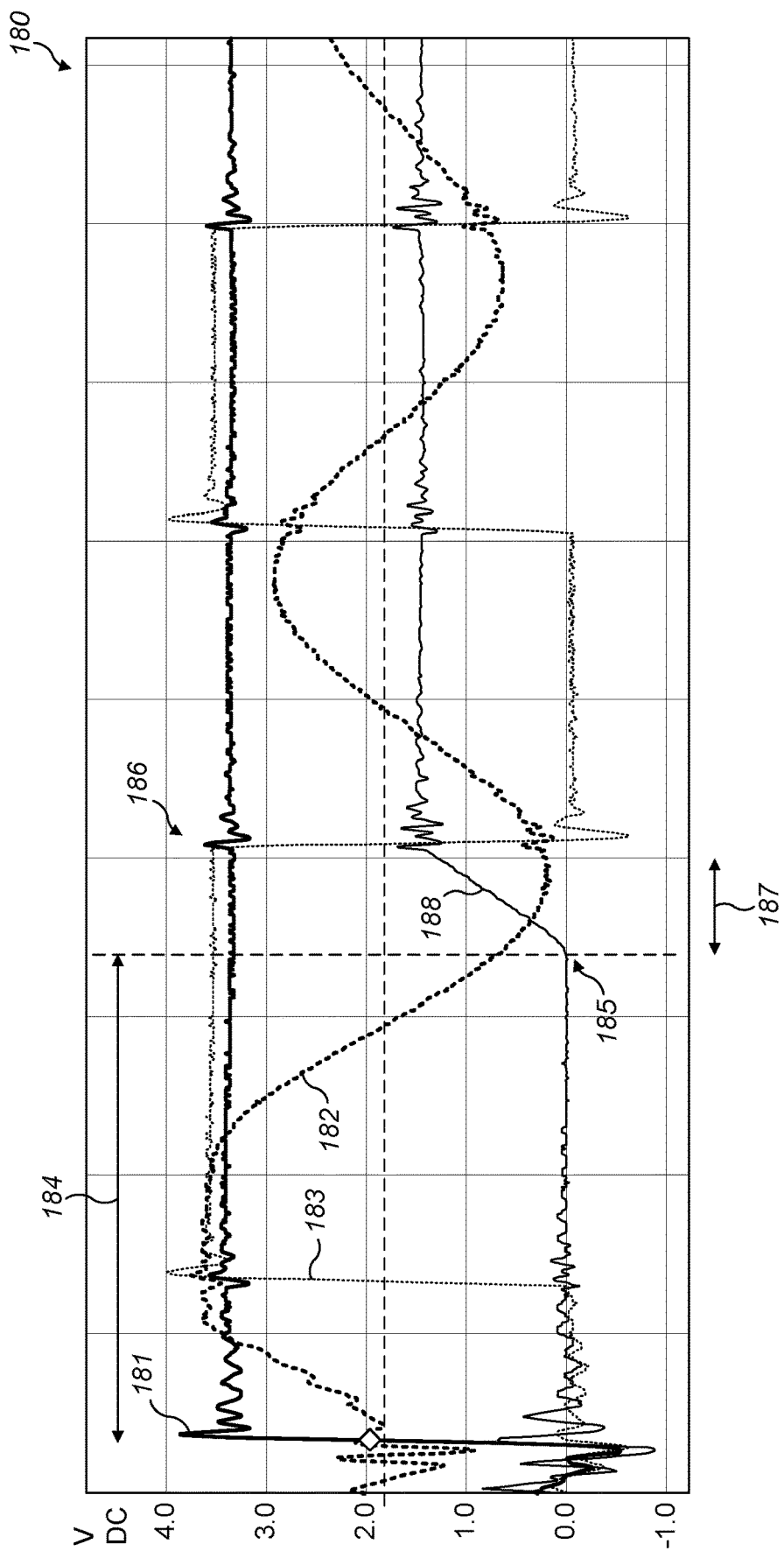
Figure 18:
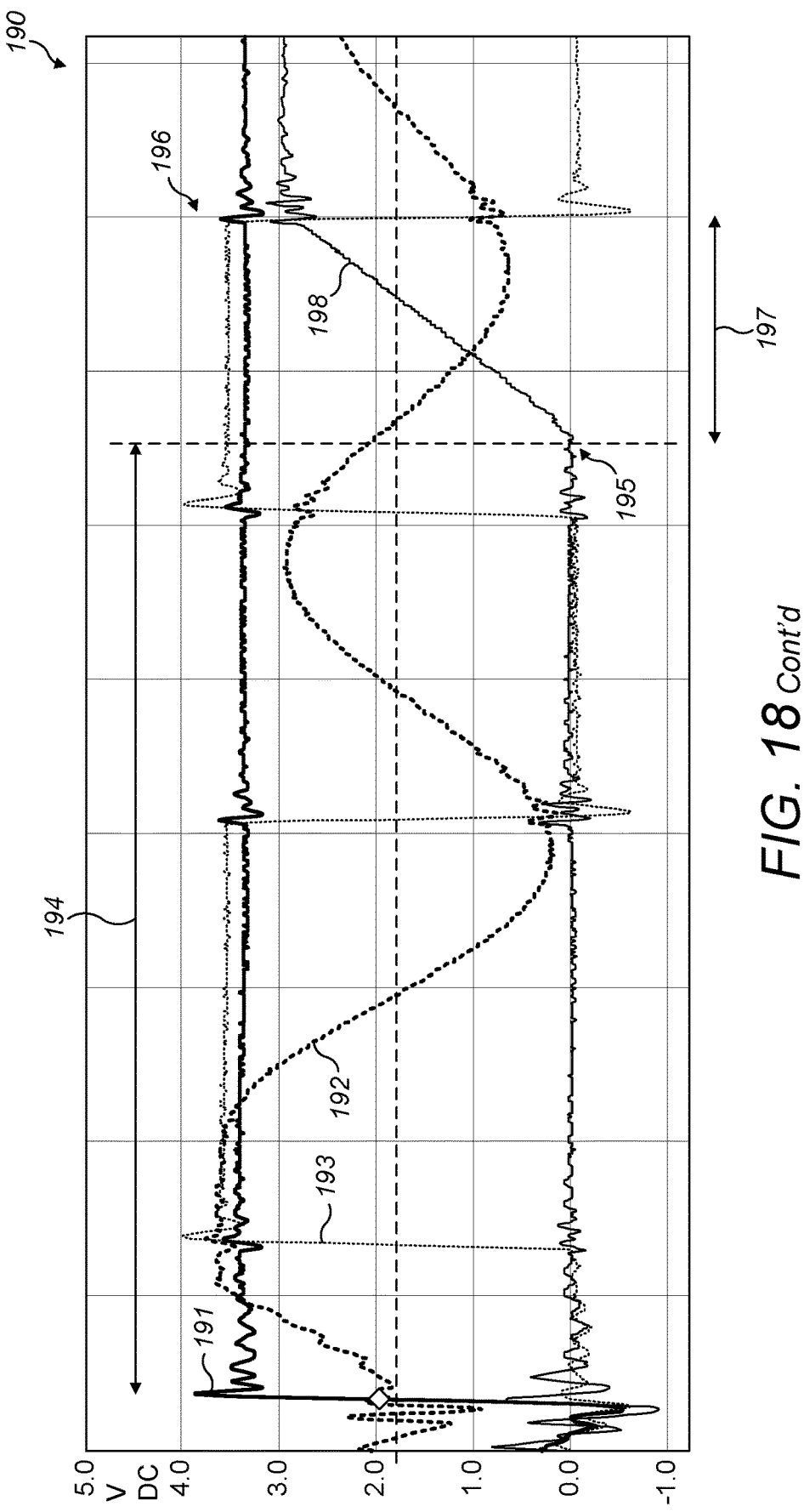

FIG. 18 shows a first plot, indicated generally by the reference numeral 180, and a second plot, indicated generally by the reference numeral 190, demonstrating an example use of the algorithm 170.

The plot 180 shows a first impulse 181 applied to the resonant circuit 14 by the impulse generating circuit 62. The application of the first impulse 181 implements the operation 171 of the algorithm 170. A first impulse response 182 is induced in response to the application of the first impulse.

The impulse response processor 64 generates a signal 183 indicating edges of the first impulse response 182. As discussed elsewhere herein, the signal 183 may be generated by a comparator (such as the comparator 152).

At operation 172 of the algorithm 170, a first impulse time period is determined. The first time response period starts at the end of a first wait period 184 following the application of the first impulse and ends at the end of an impulse response period of the relevant impulse response. In FIG. 18, the first response time period starts at time 185 and ends at time 186 and is indicated by the arrow 187. During the first time period 187, the current source 143 is enabled and a voltage is generated at the sample-and-hold circuit 144. That voltage is indicated by the reference numeral 188. The voltage shown by line 188 corresponds to the charging of the capacitor 158 with time (that is, the charge on the capacitor 158 increases with time due to the application of the constant current). At the end of the relevant impulse response, when the constant current is no longer supplied to the capacitor 156, the voltage at the sample-and-hold circuit is indicative of the first time period 187. The determination of the first time period 187 implements the operation 172 of the algorithm 170.

The plot 190 shows a second impulse 191 applied to the resonant circuit 14 by the impulse generating circuit 62. The application of the second impulse 191 implements the operation 173 of the algorithm 170. A second impulse response 192 is induced in response to the application of the first impulse.

The impulse response processor 64 generates a signal 193 indicating edges of the second impulse response 192. As discussed elsewhere herein, the signal 193 may be generated by a comparator (such as the comparator 152).

At operation 174 of the algorithm 170, a second impulse time period is determined. The first time response period starts at the end of a second wait period 194 following the application of the second impulse and ends at the end of an impulse response period of the relevant impulse response. The second wait period 194 in some embodiments is different to, e.g., greater than, the first wait period 184. In some further embodiments, the second wait period 194 is greater than the wait period 184 by an amount on the order of 1/f of the signal 182 or 192. This may be determined in advance based on empirical testing, for example. In FIG. 18, the second response time period starts at time 195 and ends at time 196 and is indicated by the arrow 197. During the time period 197, the current source 143 is enabled and a voltage is generated at the sample-and-hold circuit 144. That voltage is indicated by the reference numeral 198. At the end of the relevant impulse response, the voltage at the sample-and-hold circuit is indicative of the time period 197. The determination of the second time period 197 implements the operation 174 of the algorithm 170.

The delays 184 and 194 may be fixed and may be dependent and determined by the hardware configuration and then remain fixed for that design. For example, the delay 184 may be chosen such that the H bridge has had time to switch and the first half cycle of the response signal has had chance to complete (this tends to be a distorted cycle as shown in the plot). The delay 194 may be determined by the delay 184 plus the expected period of the response signal.

At operation 175 of the algorithm 170, an output is generated based on an estimated impulse response period. The impulse response period may be determined based on the sum of the difference between the first and second wait periods and the difference between the first and second impulse time periods.

Thus, for example, if the first wait period 184 is denoted by $w_1$, the second wait period 194 is denoted by $w_2$, the first time period 187 is denoted by $t_1$ and the second time period 197 is denoted by $t_2$, then the impulse response period is given by:

$$(w_2-w_1)+(t_2-t_1)$$

The impulse response period (and therefore the impulse response frequency) is temperature dependent and can therefore be used as a temperature indication (with appropriate scaling). It should be noted that although the period changes over time (with changing temperature), the temperature difference between successive pulses used to generate the estimate described above is negligible.

As noted above, in one example implementation, a change in temperature of 250 degrees centigrade resulted in a change in the impulse response period 138 of 13 ns. In that example, the overall period was of the order of 390 ns. Measuring a change of 13 ns in a period of 390 ns is not trivial. In at least some embodiments, the example described with reference to FIGS. 17 and 18 can be implemented with greater precision, particularly when data storage is limited.

In one embodiment, the first wait period 184 and the second wait period 194 are a predetermined number of instruction cycles of a CPU. For example, the first wait period 184 may be 9 instruction cycles and the second wait period 194 may be 14 instructions cycles. Such an arrangement is very simple to implement. In one example implementation, an instruction cycle has a period of 62.5 ns. The difference between the delays 184 and 194 for a 2.5 MHz system should be 400 ns or less. This would work out to be no more than 6 instruction cycles. In the example of 9 and 14 instructions (for the wait periods 184 and 194 respectively), we have a 5 instruction cycle difference. This has been found to work well in one example implementation and allows the system to still work if the period changes (e.g. due to heating or the insert being removed).

Figure 19:
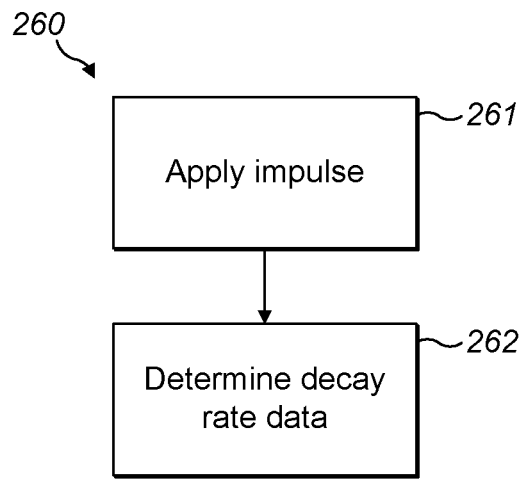

FIG. 19 is a flow chart showing an algorithm, indicated generally by the reference numeral 260, in accordance with an example embodiment. The algorithm 260 starts at operation 261 where an impulse is generated and applied to the resonant circuit 14. At operation 262, a decay rate of the impulse response induced in response to the applied impulse is determined. The decay rate may, for example, be used to determine information regarding the circuit to which the impulse is applied. By way of example, a decay rate in the form of a Q-factor measurement may be used to estimate a temperature of operation. The operation 262 is an example of the operation 74 in FIG. 7. That is, the decay rate is an example of an output based on the impulse response.

Impulse responses can be used to estimate a range of information about a circuit or system to which an impulse is applied. For example, variables of the aerosol provision device 20 described above can be estimated on the basis of impulse response variables. By way of example, such variables include temperature of operation, the presence or absence of a susceptor and/or a removable article; other properties of a susceptor and/or a removable article, fault conditions etc. Example fault conditions includes whether the removable article is inserted in the aerosol generating device in a correct manner (such as being inserted the right way round and/or being fully inserted) and whether the removable article is in good condition.

Figure 20:
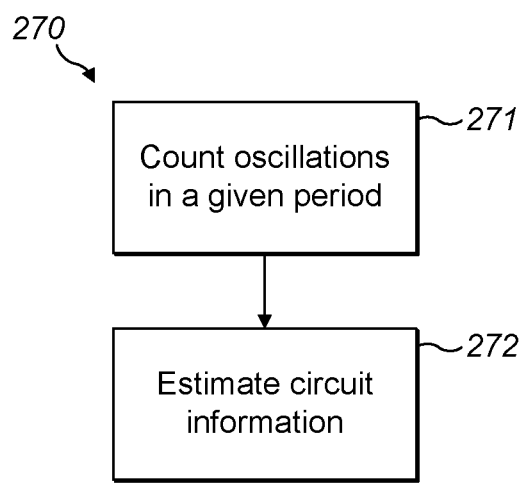

FIG. 20 is a flow chart showing an algorithm, indicated generally by the reference numeral 270, in accordance with an example embodiment. The algorithm 270 starts at operation 271 where a number of oscillations in a given period of an impulse response is counted. At operation 272, circuit information (such as the presence or absence of an inserted article and/or a susceptor, temperature of operation, other properties of a susceptor and/or a removable article etc.) is determined on the basis of the counted number of oscillations. By way of example, a processor (such as the impulse response processor 64) may be provided for determining the number of oscillations in a given period of time of the impulse response signal. Such a measurement may, for example, be used to determine whether or not a removable article is fitted within the apparatus on the basis of said determined number of oscillations.

Figure 21:
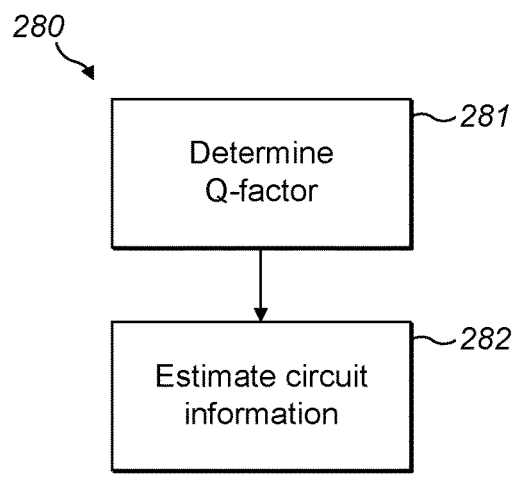

FIG. 21 is a flow chart showing an algorithm, indicated generally by the reference numeral 280, in accordance with an example embodiment. The algorithm 280 starts at operation 281 where a Q-factor of an impulse response is determined. At operation 282, circuit information (such as the presence or absence of an inserted article and/or a susceptor, temperature of operation, other properties of a susceptor and/or a removable article etc.) is determined on the basis of the counted number of oscillations. By way of example, a processor (such as the impulse response processor 64) may be provided for determining the Q-factor measurement of the impulse response by determining a number of oscillation cycles for the impulse response to halve in amplitude and multiplying the determined number of cycles by a predetermined value. Such a measurement may, for example, be used to determine whether or not a removable article is fitted within the apparatus on the basis of said determined Q-factor. The skilled person will be aware of other arrangements for determining or estimating a Q-factor of the relevant circuit.

Figure 22:
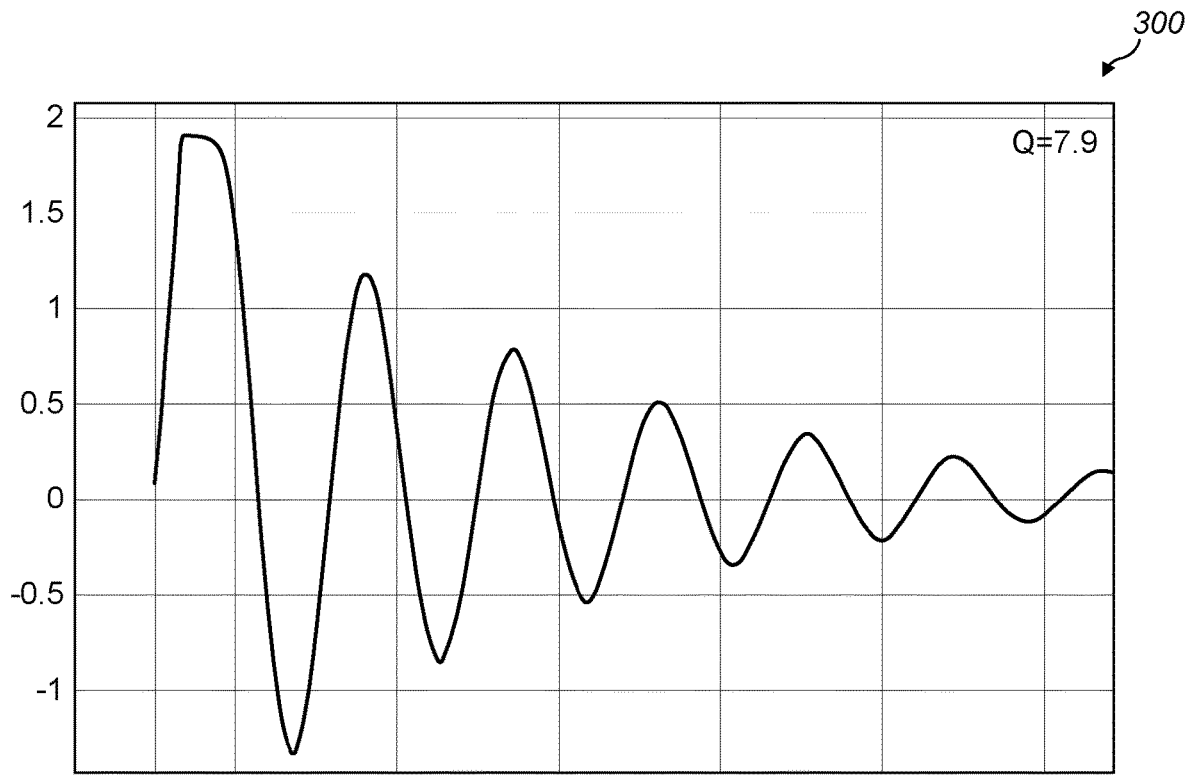

FIG. 22 is a plot, indicated generally by the reference numeral 300, showing an output in accordance with an example embodiment. The plot 300 shows an impulse response detected by the impulse response processor 64 in a mode of operation of the aerosol provision device 20 when an article 21 was inserted and operating at a temperature of about 176 degrees centigrade (i.e. a 'hot' mode of operation). The Q-factor of the plot 300 is about 7.9.

Figure 23:

FIG. 23 is a plot, indicated generally by the reference numeral 301, showing an output in accordance with an example embodiment. The plot 301 shows an impulse response detected by the impulse response processor 64 in a mode of operation of the aerosol provision device 20 when an article 21 was inserted and operating at a temperature of about 20 degrees centigrade (i.e. a 'cold' mode of operation). The Q-factor of the plot 302 is about 11.3.

Figure 24:
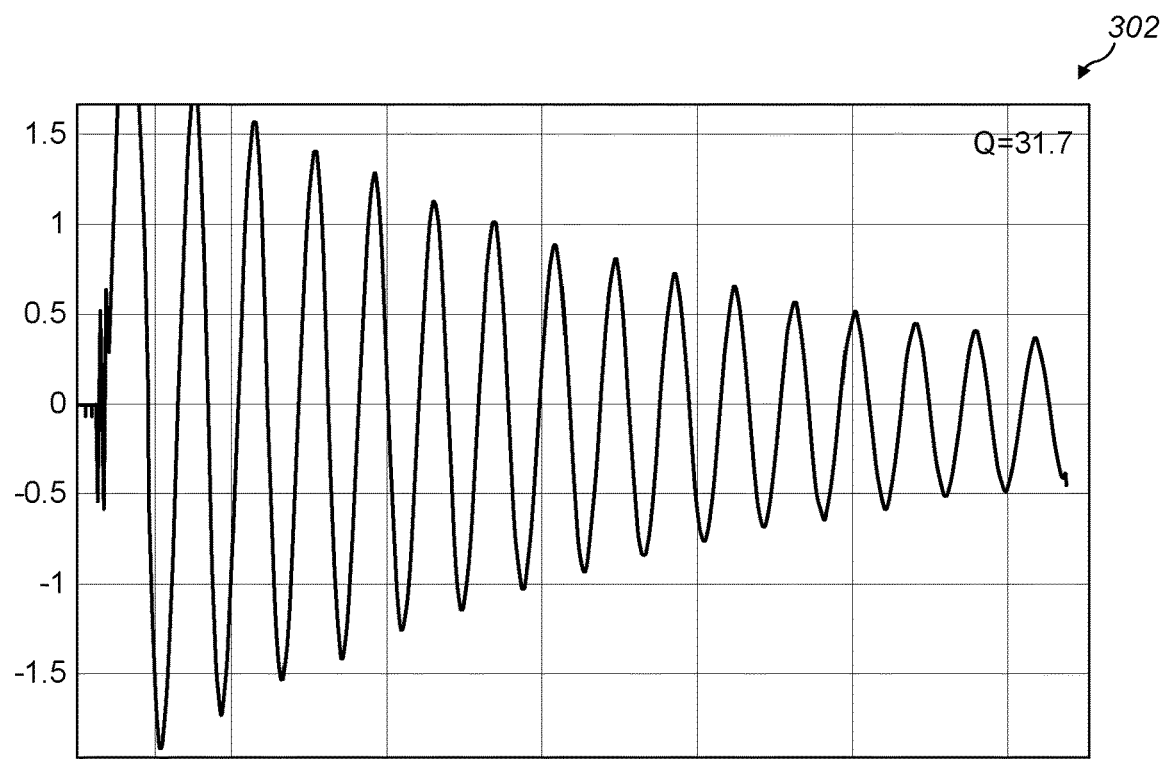

FIG. 24 is a plot, indicated generally by the reference numeral 302, showing an output in accordance with an example embodiment. The plot 302 shows an impulse response detected by the impulse response processor 64 in a mode of operation of the aerosol provision device 20 when an article 21 was not inserted (i.e. a 'no rod' mode of operation). The Q-factor of the plot 300 is about 31.7.

It will be readily apparent that the algorithm 280 could be used to distinguish between the scenarios shown in plots 300 to 302 described above. That is, based on the calculated Q-factor (which is an example of the decay rate data of the impulse response signal), it is possible to distinguish between a susceptor present or absent condition (e.g., an article 21 inserted or not), a 'cold' susceptor and a 'warm' susceptor. Moreover, it is also possible to determine the temperature of the susceptor on the basis of the Q-value. From the above plots, it can be seen that (in these examples) the Q-factor generally decreases with increasing temperature.

Equally, it will be readily apparent that the algorithm 270 could be used to distinguish between the scenarios shown in plots 301 and 302 described above. In accordance with algorithm 270, counting the number of oscillations in a given time period provides characteristic data, e.g., the temperature, of a susceptor. Indeed, plot 301 has a much lower oscillation count for a given time period than plot 302. In other words, the number of oscillations for a given time period correlates with the temperature of the susceptor. From the above plots, it can be seen that (in these examples) the number of oscillations generally increases with increasing temperature.

Figure 25:
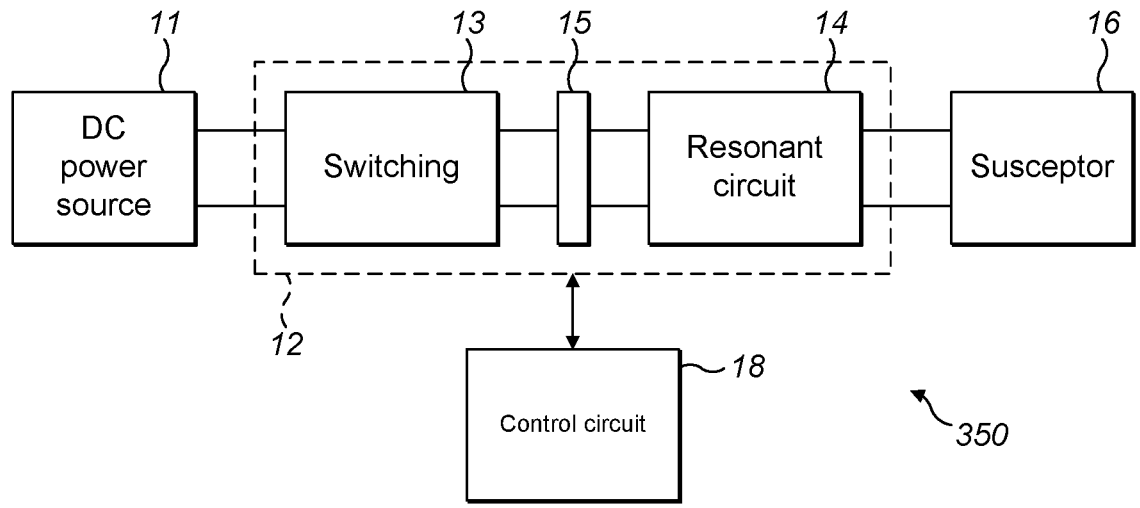

FIG. 25 is a block diagram of a system, indicated generally by the reference numeral 350, in accordance with an example embodiment. System 350 comprises the direct current (DC) voltage supply 11, the switching arrangement 13, the resonant circuit 14, the susceptor arrangement 16, and the control circuit 18 of the system 10 described above. In addition, the system 350 comprises a current sensor 15. The switching arrangement 13, the resonant circuit 14, and the current sensor 15 may be coupled together in an inductive heating arrangement 12.

Figure 26:
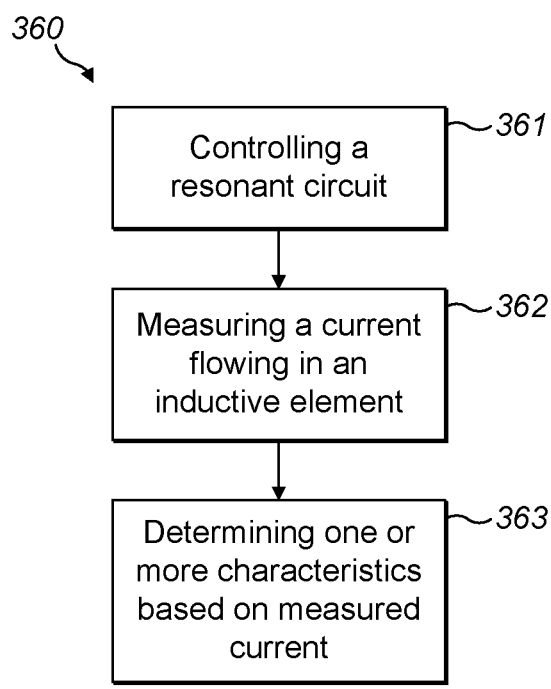
Figure 27:
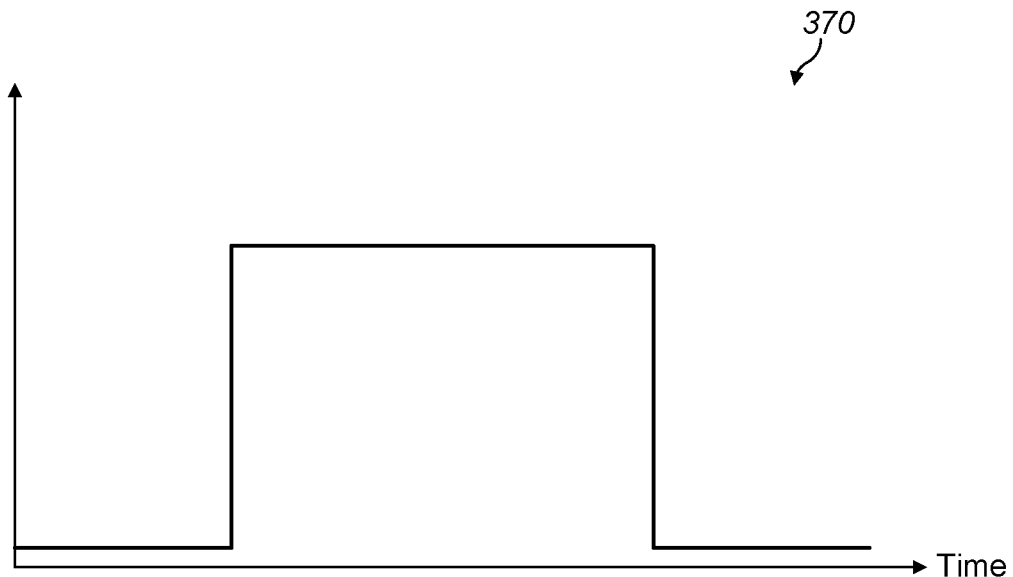
Figure 28:
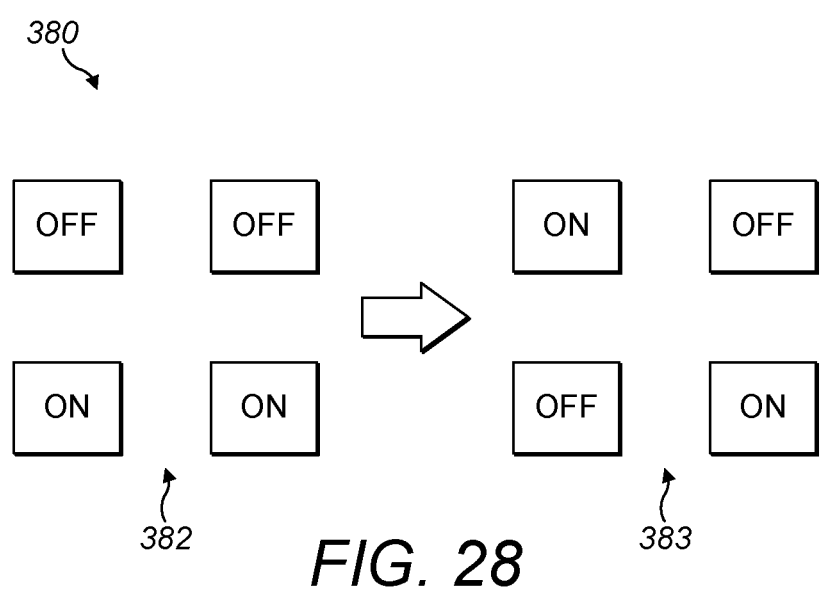
Figure 29:
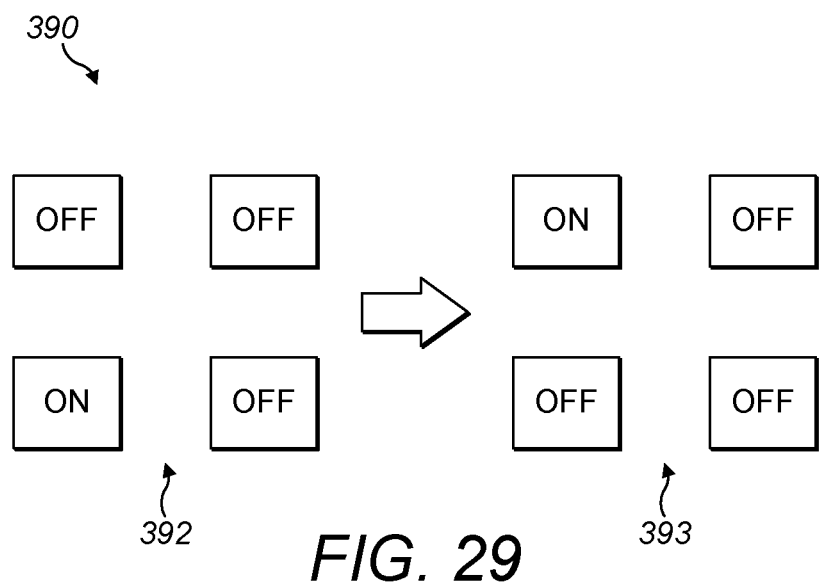

FIG. 26 is a flow chart showing an algorithm, indicated generally by the reference numeral 360, in accordance with an example embodiment. The algorithm 360 shows an example use of the system 350.

At operation 361 of the algorithm 360, a resonant circuit of an aerosol generating device may be controlled, where the resonant circuit may comprise one or more inductive elements. The one or more inductive elements may be used for inductively heating a susceptor arrangement to heat an aerosol generating material. Heating the aerosol generating material may thereby generate an aerosol in a heating mode of operation of the aerosol generating device. For example, the resonant circuit 14 of the system 350 may be controlled by the control module 18.

At operation 362, a current flowing in an inductive element is measured by a current sensor. For example, a current flowing in one or more inductive elements of the resonant circuit 14 may be measured by the current sensor 15.

At operation 363, one or more characteristics of the aerosol generating device and/or an apparatus for the aerosol generating device may be determined based, at least in part, on the measured current. The one or more characteristics may include one or more of the following: the presence or absence of a susceptor; the presence or absence of a removable article; properties of the removable article; fault conditions (such as whether the removable article is inserted in the aerosol generating device in a correct manner (such as being inserted the right way round and/or being fully inserted) and whether the removable article is in good condition); whether the current matches the current of a genuine susceptor and/or removable article; whether the current is consistent with the susceptor having a temperature above a first temperature threshold and/or below a second temperature threshold.

The use of a current measurement to determine characteristics of a circuit or system may be used in combination with any of the other methods described herein (such as Q-factor and/or resonant frequency determining arrangements and/or oscillation counting arrangements). It should be noted that the use of a current measurement to determine the presence or absence of a susceptor, for example, is not required as it is possible to determine the presence or absence of a susceptor based on the calculated Q-factor alone.

In the example embodiments described above, each of the impulse responses has been generated in response to a rising impulse signal. For example, FIG. 8 shows an example impulse 80 based on a rising edge that might be applied to a resonant circuit, with FIG. 9 showing an example impulse response that might be received in response to that impulse. It is not essential to all embodiments that impulses are generated on a rising edge. For example, the circuit 40 could be used to generate an impulse as a falling edge. Moreover, both rising and falling edges could be used. This may, for example, have the advantage of providing more impulse responses in a given time period (since impulse responses could be generated on both rising and falling edges).

By way of example, FIG. 27 is a plot, indicated generally by the reference numeral 370, showing an example pair of impulses in accordance with an example uses of example embodiments. The plot 370 includes a first impulse on a rising edge and a second impulse on a falling edge. The first impulse may be referred to as a forward ping, with the second impulse being referred to as a backward ping. The use of both forward and backward pings may be useful, for example, in conjunction with the algorithm 170 in which two pings may be generated in a relatively short time period.

FIG. 28 is a block diagram of a circuit switching arrangement, indicated generally by the reference numeral 380, in accordance with an example embodiment. The switching arrangement 380 shows switch positions of the circuit 40 in a first state, indicated generally by the reference numeral 382, and a second state, indicated generally by the reference numeral 383.

In the first state 382, the switches **45*a* and 45*c* of the circuit 40 are off (i.e. open) and the switches 45*b* and 45*d* are on (i.e. closed). In the second state 383, the switches 45*a* and 45*d* are on (i.e. closed) and the switches 45*b* and 45*c* are off. Thus, in the first state 382, both sides of the resonant circuit 49 are connected to ground. In the second state 383**, a voltage pulse (i.e. an impulse) is applied to the resonant circuit.

FIG. 29 is a block diagram of a circuit switching arrangement, indicated generally by the reference numeral 390, in accordance with an example embodiment. The switching arrangement 390 shows switch positions of the circuit 40 in a first state, indicated generally by the reference numeral 392, and a second state, indicated generally by the reference numeral 393.

In the first state 392, the switch **45*b* is on (i.e. closed) and the switches 45*a*, 45*c* and 45*d* are off (i.e. open). Thus, one side of the resonant circuit 49 is grounded. In the second state 393**, a voltage pulse (i.e. an impulse) is applied to the resonant circuit.

In the second state 382 of the switching arrangement 380, a current is able to flow through the first switch **45*a*, the resonant circuit 49 and the switch 45*d*. This current flow may lead to heat generation and discharging of a power supply (such as a battery). Conversely, in the second state 393 of the switching arrangement 390, a current will not flow through the switch 45***d*. Accordingly, heat generation and power supply discharge may be reduced. Moreover, noise generation may be reduced on the generation of each impulse.

Figure 30:
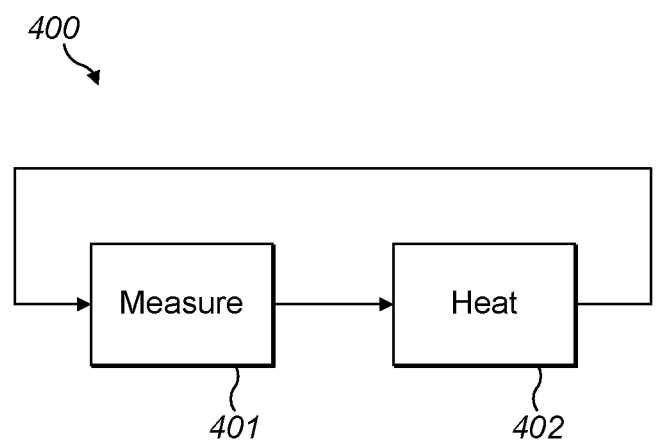

FIG. 30 is a flow chart, indicated generally by the reference numeral 400, showing an algorithm in accordance with an example embodiment. The algorithm 400 shows an example use of the systems described herein.

The algorithm 400 starts with a measurement operation 401. The measurement operation 401 may, for example, include a temperature measurement. Next, at operation 402, a heating operation is carried out. The implementation of the heating operation 402 may be dependent on the output of the measurement operation 401. Once the heating operation 402 is complete, the algorithm 400 returns to operation 401, where the measurement operation is repeated.

The operation 401 may be implemented by the system 60 in which an impulse is applied by the impulse generation circuit 62 and a measurement (e.g. a temperature measurement) determined based on the output of the impulse response processor 64. As discussed above, a temperature measurement may be based, for example, on a decay rate, an impulse response time, an impulse response period etc.

The operation 402 may be implemented by controlling the circuit 40 in order to heat the susceptor 16 of the system 10. The inductive heating arrangement 12 may be driven at or close to the resonant frequency of the resonant circuit, in order to cause an efficient heating process. The resonant frequency may be determined based on the output of the operation 401.

In one implementation of the algorithm 400, the measurement operation is conducted for a first period of time, the heating operation 402 is conducted for a second period of time and the process is then repeated. For example, the first period of time may be 10 ms and the second period of time may be 250 ms, although other time periods are possible. In other words, the measurement operation may be performed between successive heating operations. It should also be noted that the heating operation 402 being conducted for the second period of time does not necessarily imply that power is supplied to the induction coil for the whole duration of the second period of time. For example, power may only be supplied for a fraction of the second period of time.

In an alternative embodiment, the algorithm 400 may be implemented with the heating operation 402 having a duration dependent on a required level of heating (with the heating duration being increased if more heating is required and reduced if less heating is required). In such an algorithm, the measurement operation 401 may simply be carried out when heating is not being conducted, such that the heating operation 402 need not be interrupted in order to conduct the measurement operation 401. This interleaved heating arrangement may be referred to as a pulse-width-modulation approach to heating control. By way of example, a pulse-width modulation scheme may be provided at a frequency of the order of 100 Hz, where each period is divided into a heating portion (of variable length) and a measurement portion.

Figure 31:
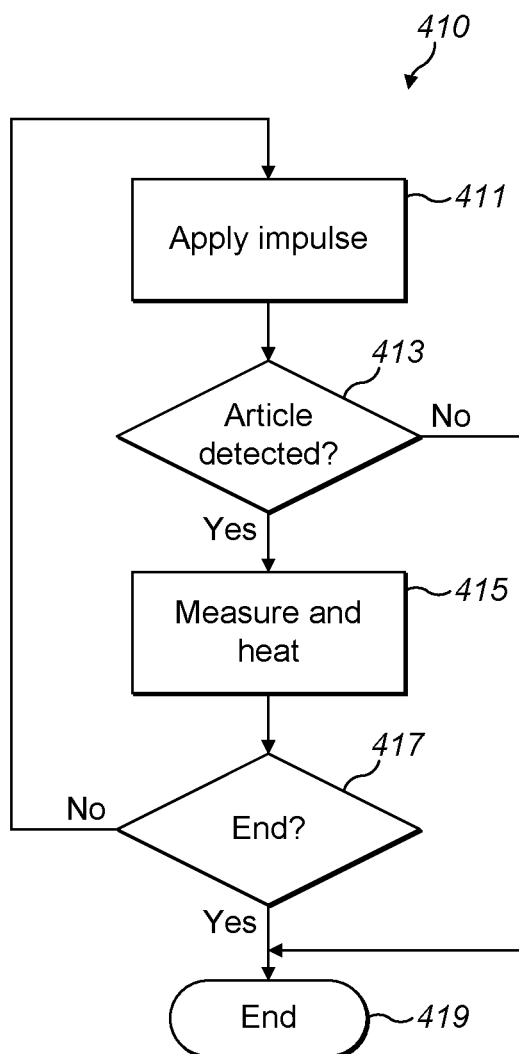

FIG. 31 is a flow chart, indicated generally by the reference numeral 410, showing an algorithm in accordance with an example embodiment. The algorithm 410 may be implemented using the system 60 described above.

The algorithm 410 starts at operation 411, where an impulse is applied to the resonant circuit 14 by the switching circuit 13 (e.g. the circuit 40). At operation 413, an impulse response (e.g. detected using the impulse response processor 64) is used to determine whether an article (such as the article 21) is present in the system to be heated. As discussed above, the presence of the article 21 affects the impulse response in a manner that can be detected.

If an article is detected at operation 413, the algorithm 410 moves to operation 415; otherwise, the algorithm terminates at operation 419.

At operation 415, measurement and heating operations are implemented. By way of example, the operation 415 may be implemented using the algorithm 400 described above. Of course, alternative measurement and heating arrangements could be provided.

Once a number of heating measurement and heating cycles have been conducted, the algorithm 400 moves to operation 417, where it is determined whether heating should be stopped (e.g. if a heating period has expired, or in response to a user input). If so, the algorithm terminates at operation 419; otherwise the algorithm 400 returns to operation 411.

It should be appreciated that the above techniques for determining one or more properties of the inductive arrangement or susceptor arrangement can be applied to individual inductive elements. For systems that comprise multiple inductive elements, such as the system 20, which comprises three inductive elements 23*a*, 23*b*, and 23*c*, the system may be configured such that the one or more parameters, such as the temperature, can be determined for each of the inductive elements using the above described techniques. In some implementations, it may be beneficial for the system to operate using separate measurements for each of the inductive elements. In other implementations, it may be beneficial for the system to operate using only a single measurement for the plurality of inductive elements (e.g., in the case of determining whether the article 21 is present or not). In such situations, the system may be configured to determine an average measurement corresponding to the measurements obtained from each inductive element. In other instances, only one of the plurality of inductive elements may be used to determine the one or more properties.

Some embodiments include controlling temperature, for example of a replaceable article 21. In some embodiments, the temperature may be controlled using the principles of proportional integral derivative (PID) control. This typically provides a better control performance than thermostatic control and may, for example, lead to further control advantages, such as the ability to detect failures in a replaceable article (such as damaged foils) during the temperature control phase.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:
1. An apparatus comprising:
an impulse generation circuit for applying an impulse to a resonant circuit comprising an inductive element configured to inductively heat a susceptor and a capacitor, wherein the applied impulse induces an impulse response between the capacitor and the inductive element of the resonant circuit, wherein the impulse response has a resonant frequency; and
an output circuit configured to provide an output signal dependent on one or more properties of the impulse response, wherein the output circuit comprises an edge detection circuit for identifying edges of said impulse response.

2. The apparatus of claim 1, wherein the output signal is dependent on a time period of oscillations of the impulse response, such that the output signal is indicative of the resonant frequency of the impulse response.

3. The apparatus of claim 1, wherein the edge detection circuit is provided as part of a charge time measurement unit.

4. The apparatus of claim 1, wherein the output signal is based on a time period from a first edge of the impulse response and a second edge that is at least one complete cycle of said impulse response later.

5. The apparatus of claim 4, wherein the output circuit is configured to generate a voltage ramp when the first edge is identified and ends when the second edge is identified, wherein the output signal is based on an output of said voltage ramp.

6. The apparatus of claim 1, wherein the edge detection circuit is configured to determine a propagation delay between an application of the impulse to the resonant circuit and a detection of the impulse response in response to the applied impulse, wherein the output signal is dependent on said propagation delay.

7. The apparatus of claim 1, further comprising an impulse detection circuit, wherein:
the impulse generation circuit is configured to apply a first impulse and a second impulse to the resonant circuit, wherein the first impulse induces a first impulse response and the second impulse induces a second impulse response, wherein each impulse response has a resonant frequency;
the impulse detection circuit is configured to determine a first time period from the end of a first wait period following the application of the first impulse to the end of a respective impulse response period of the impulse response and a second time period from the end of a second wait period following the application of the second impulse to the end of a respective impulse period of the impulse response; and
the output circuit is configured to determine an impulse response period dependent on a sum of the difference between the first and second wait periods and the difference between the first and second time periods.

8. The apparatus of claim 7, wherein the impulse detection circuit comprises a current source control circuit for initiating a current source at the end of the wait period following the application of a respective impulse and terminating the current source at the end of the impulse response period of the said impulse response.

9. The apparatus of claim 8, further comprising an analog-to-digital converter coupled to the current source, wherein the analog-to-digital converter provides an output for use in determining the first and/or second time periods.

10. The apparatus of claim 7, wherein the impulse response period is used to provide a temperature measurement of said susceptor.

11. The apparatus of claim 1, wherein the output signal is dependent on a decay rate of voltage oscillations of the impulse response.

12. The apparatus of claim 1, further comprising a processor for determining a Q-factor measurement of the impulse response, wherein the output signal is based on said Q-factor measurement.

13. The apparatus of claim 12, wherein said processor for determining the Q-factor measurement of the impulse response determines said Q-factor measurement by determining a number of oscillation cycles for the impulse response to halve in amplitude and multiplying the determined number of cycles by a predetermined value.

14. The apparatus of claim 12, further comprising determining one or more performance properties based on the determined Q-factor.

15. The apparatus of claim 1 further comprising a counter for determining a number of oscillations in a defined time period.

16. The apparatus as claimed in claim 15, wherein the output circuit is configured to provide the output signal to indicate whether or not a removable article is fitted within the apparatus on the basis of said determined number of oscillations.

17. The apparatus of claim 1, wherein the output signal is used to provide a temperature measurement of said susceptor.

18. The apparatus of claim 17, wherein the output signal is scaled to provide said temperature measurement.

19. The apparatus of claim 1, wherein the impulse generation circuit comprises a first switching arrangement used to generate the impulse by switching between positive and negative voltage sources.

20. The apparatus of claim 1, wherein the susceptor is configured to aerosolise a substance in a heating mode of operation.

21. The apparatus of claim 1, further comprising a signal conditioning circuit to provide an offset to the impulse response.

22. The apparatus of claim 1, further comprising a current sensor for measuring a current flowing in the inductive element.

23. The apparatus of claim 1, wherein the susceptor is included as part of a removable consumable.

24. The apparatus of claim 1, further comprising a control module for determining a performance of said apparatus based on said output signal.

25. A system comprising:
a plurality of resonant circuits, each resonant circuit comprising an inductive element, for inductively heating a susceptor, and a capacitor;
an impulse generation circuit for applying an impulse to at least one of the plurality of resonant circuits to induce an impulse response between the capacitor and the inductive element of the selected resonant circuit, wherein the impulse response has a resonant frequency; and
an output circuit for providing an output signal dependent on one or more properties of the impulse response; wherein the output circuit comprises an edge detection circuit for identifying edges of said impulse response.

26. The system of claim 25, wherein the one or more properties of the impulse response comprise a time period of voltage oscillations of the impulse response, such that the output signal is indicative of the resonant frequency of the impulse response.

27. A method comprising:

applying an impulse to a resonant circuit comprising an inductive element for inductively heating a susceptor, and a capacitor, wherein the applied impulse induces an impulse response between the capacitor and the inductive element of the resonant circuit, wherein each impulse response has a resonant frequency; and generating an output signal dependent on one or more properties of the impulse response;

wherein an output circuit generates the output signal, and the output circuit comprises an edge detection circuit for identifying edges of said impulse response.

28. The method of claim 27, wherein the output signal is dependent on a time period of oscillations of the impulse response, wherein the output signal is indicative of the resonant frequency of the impulse response.

29. The method of claim 27, wherein the impulse is applied to the resonant circuit in a temperature measurement mode of operation.

30. The method of claim 27, further comprising inductively heating a susceptor using said inductive element in order to aerosolise a substance in a heating mode of operation.

31. The method of claim 27, further comprising determining a Q-factor measurement of the impulse response.

32. The method of claim 31, wherein determining the Q-factor measurement of the impulse response comprises determining a number of oscillation cycles for the impulse response to halve in amplitude and multiplying the determined number of cycles by a predetermined value.

33. The method of claim 31, further comprising determining one or more performance properties based on the determined Q-factor.

34. The method of claim 27, further comprising:

applying a first impulse to the resonant circuit to induce a first impulse response, wherein the first impulse occurs on a rising edge of a control signal; and applying a second impulse to the resonant circuit to induce a second impulse response, wherein the second impulse occurs on a falling edge of a control signal.

35. The method of claim 34, further comprising:

generating a first output signal dependent on one or more properties of the first impulse response; and generating a second output signal dependent on one or more properties of the second impulse response.

36. A computer-readable medium containing a computer program comprising instructions for causing an apparatus to perform at least the following:

apply an impulse to a resonant circuit comprising an inductive element, for inductively heating a susceptor, and a capacitor, wherein the applied impulse induces an impulse response between the capacitor and the inductive element of the resonant circuit, wherein each impulse response has a resonant frequency; and generate an output signal dependent on one or more properties of the impulse response;

wherein an output circuit generates the output signal, and the output circuit comprises an edge detection circuit for identifying edges of said impulse response.

* * * * *